(12) United States Patent
Sun et al.

(10) Patent No.: US 10,505,369 B2
(45) Date of Patent: Dec. 10, 2019

(54) BATTERY ENERGY STORAGE SYSTEMS BASED FAST SYNCHRONIZATION MACHINE FOR POWER GRIDS

(71) Applicant: Mitsubishi Electric Research Laboratories, Inc., Cambridge, MA (US)

(72) Inventors: Hongbo Sun, Lexington, MA (US); Gang Wang, Medford, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 223 days.

(21) Appl. No.: 15/467,108

(22) Filed: Mar. 23, 2017

(65) Prior Publication Data

US 2018/0278060 A1    Sep. 27, 2018

(51) Int. Cl.
| | |
|---|---|
| H02J 3/38 | (2006.01) |
| H02J 3/14 | (2006.01) |
| H02J 3/46 | (2006.01) |
| H02J 7/00 | (2006.01) |
| H02J 13/00 | (2006.01) |
| H02K 19/16 | (2006.01) |
| H02J 3/08 | (2006.01) |
| H02J 3/42 | (2006.01) |

(52) U.S. Cl.
CPC ............... *H02J 3/381* (2013.01); *H02J 3/08* (2013.01); *H02J 3/14* (2013.01); *H02J 3/42* (2013.01); *H02J 3/46* (2013.01); *H02J 7/0068* (2013.01); *H02J 13/0096* (2013.01); *H02K 19/16* (2013.01); *Y02E 40/10* (2013.01)

(58) Field of Classification Search
CPC .................. H02J 3/381; H02J 3/08; H02J 3/14
USPC .............................................................. 307/84
See application file for complete search history.

(56) References Cited

U.S. PATENT DOCUMENTS

| 5,798,633 A | 8/1998 | Larsen et al. |
| 7,016,793 B2 * | 3/2006 | Ye .................... G01R 19/2513 |
| | | 290/40 B |

(Continued)

FOREIGN PATENT DOCUMENTS

| WO | 9919956 A1 | 4/1999 |
| WO | 2012101318 A1 | 8/2012 |
| WO | 2014155647 A1 | 10/2014 |

*Primary Examiner* — Daniel Kessie
*Assistant Examiner* — Swarna N Chowdhuri
(74) *Attorney, Agent, or Firm* — Gennadiy Vinokur; James McAleenan; Hironori Tsukamoto

(57) ABSTRACT

A power system including a first and a second grid, each grid having power flow parameters. A breaker installed at a point of common coupling between the first and second grid. A first and a second sensor, each located on a side of the point of the common coupling for determining the power flow parameters of the first and second grid. A controller, iteratively controls a power source to supply a first amount of power, based on determining a frequency mismatch between the first and the second power grid, until a first predetermined condition is met. Then, determines if the first and second grid reach a second predetermined condition of phase mismatches and frequencies mismatches of the first and second grid, and if not, iteratively control the power source to supply a second amount of power until the second predetermined condition is met, then places breaker in closed position.

20 Claims, 23 Drawing Sheets

(56) References Cited

U.S. PATENT DOCUMENTS

| | | | |
|---|---|---|---|
| 7,915,868 B1 | 3/2011 | Maters et al. | |
| 8,405,252 B2 | 3/2013 | Schuette et al. | |
| 9,276,420 B2 | 3/2016 | Sun et al. | |
| 2011/0248569 A1* | 10/2011 | Son | H02J 3/381 |
| | | | 307/87 |
| 2012/0190554 A1* | 7/2012 | Hartig | B60L 50/13 |
| | | | 505/166 |
| 2013/0162035 A1* | 6/2013 | Sullivan | H02H 7/261 |
| | | | 307/18 |
| 2014/0252863 A1* | 9/2014 | Patel | H02J 3/44 |
| | | | 307/82 |
| 2017/0214249 A1* | 7/2017 | Seeley | H02J 3/44 |

* cited by examiner

Step 110) Obtain measurement data from Sensor 1 (1st grid) & Sensor 2 (2nd grid)

Step 120) Determine power flow parameters (phase and frequency) for 1st and 2nd grid at sides of common coupling via breaker

Step 130) A controller to:

➤ Iteratively control power source through dq-current controller to supply a first amount of power determined by automatic power compensation controller based on continually determining frequency mismatch between first grid and second grid through the detection block, until a first predetermined condition is met; and ➤ Determine, if first grid and second grid reached a second predetermined condition of phase mismatches and frequencies mismatches of the first and second grid, if not, iteratively control power source through dq-current controller to supply a second amount of power determined by the automatic power compensation controller until the second predetermined condition is met

Step 140) Controller verifies when second predetermined condition met, moves breaker from an open position to a close position

FIG. 1D

BATTERY ENERGY STORAGE SYSTEMS BASED FAST SYNCHRONIZATION MACHINE FOR POWER GRIDS

FIELD

The present disclosure relates generally to controlling of generation units in electric power systems, and more particularly to design a grid fast synchronization machine with battery energy storage system.

BACKGROUND

Electric power systems have multiple generation units that operate in synchronism under a normal operation. That is, frequency, phase, and amplitude of voltages at the terminals of a generator hold a fixed relationship with the same parameters of the remaining generators in the power system. Before a generator can be connected to an electric power system, the frequency, phase, and amplitude of the voltages at its bus need to be matched with those of the power system at the point of interconnection. Once, the so called synchronization parameters are matched within a desired tolerance, the generator breaker is closed. Any mismatch in the synchronization parameters during connection of a generation unit by a generator breaker may result in undesired transients and disruption of the system.

Traditional synchronization methods for two grid systems is calculating and adapting reference values of the governor and excitation systems. From the frequency deviation and phase angle difference points of view, the total synchronization time is largely depending on the primary and secondary controller of the generator. For a large scale generation system, synchronous machine based power generations, can take several minutes for the grid to finish the synchronization process. However, with the fast development of renewable energy generations, the entire gird is becoming more distributed. Due to the fact that the distributed grid is vulnerable than synchronous machine based grid system, the synchronization method purely relying on the primary and secondary controller is not feasible.

Therefore, the fast synchronization is desired to improve the robustness of the modern power systems. For example, U.S. Pat. No. 7,915,868 B1 disclosed a method of reducing the time to synchronize a turbomachine generator with the electrical grid system. The present disclosure is focused on the design of voltage synchronization during the start-up process of the synchronous machine, among other things. However, the phase and frequency synchronization is more critical than voltage synchronization and not addressed appropriately.

Therefore, there is a need to develop more effective way to achieve fast synchronization with the help of battery systems.

SUMMARY

The present disclosure relates generally to controlling of generation units in electric power systems, and more particularly to design a grid fast synchronization machine with battery energy storage system.

The embodiments of the present disclosure are based on several realizations that included using a controller in communication with sensors and a power source, to iteratively control the power source to supply a first amount of power, and continually determine a frequency mismatch between a first power grid and a second power grid, until a first predetermined condition can be met. Further, we realized that we could introduce a second predetermined condition of phase mismatches and the frequencies mismatches for the first and the second power grid. Wherein we monitor the first power grid and the power second grid to see if the second predetermined condition of the phase mismatches and the frequencies mismatches we met, and if not, iteratively control the power source to supply a second amount of power until the second predetermined condition is met. Wherein, then a breaker can change position from an open position to a close position when the second predetermined condition is met.

However, in order to better understand our realizations, we need to address aspects of synchronization of a generation unit or a power grid to another power grid. In particular, how to close a switch that connects the grids, in a timely manner to provide for fast synchronization, and to avoid grid collapse. At least one reason the present disclosure needed to identify such solutions, is that switch closings are a concern due to the fact that more power electronics based devices are being installed in today's power systems. For example, the power system of today has much less inertia than before, and thus has less time for the power system to act for emergencies, including, closing switches to re-configure them. In other words, switch closing requires the voltage magnitude and phase angles between two terminals of switches to be synchronized, and this synchronization process takes a long time to synchronize the two energized sections. In order to find solutions to a faster synchronization, the present disclosure focused on challenges presented by switch closing, among other things.

We realized through experimentation, the problem we needed to solve included how to perform synchronization between generators or power grids before connecting them into a common grid. For example, we initially experimented with performing synchronization between generators by controlling the generator, i.e. the power produced by each generator, to be connected to the grid. However, we found that such synchronization was slow, and required long-distant communication, and that direct parameter of synchronization was only frequency, not the phase. The phase is synchronized by preserving a gap between the synchronized frequencies over a period of time. We learned, among other things, that the cause of the problem is due to the dynamics of the generator are too slow for rapid synchronization. Specifically, when reviewing the principles of the droop speed control, the frequency of a generator is directly proportional to its speed, the speed can be changed by mechanical components of the generator, and they are slow. We discovered that the phase along with the frequency needs to be incorporated in our solution to fast synchronization.

To overcome the slowness of the dynamics of the generator and to provide for fast synchronization without collapsing the common grid, among other things. We realized that instead of replacing the synchronization device with a power device having faster dynamics, we needed to supplement conventional synchronization with an additional synchronization boost using a power source, i.e. a DC power storage device. In such a manner, the legacy of conventional approach is preserved, while synchronization time can be reduced.

For example, we further realized that to avoid communication between the generator and the DC power storage device, we can assume that the generator is behaving in a prudent way, i.e., trying to synchronize the grids. Such that, by having that assumption allows us to perform synchronization iteratively. The DC power storage device can then measure power flow parameters at both sides of the point of common coupling and perform energy charge/discharge at each iteration, based on the result of the measurements without fear to contradict and/or dis-balance the generator control.

However, we came to the realization that due to iterative nature of control, we cannot determine the required charge/discharge, and thus need to separate the control in two stages: (1) synchronization of frequencies and (2) synchronization of phases. Which is because frequency synchronization can be done more rapidly than phase synchronization, i.e. initial rough tuning and final fine tuning.

To help understand synchronization and to further grasp our realizations, it is important to comprehend the dynamics of synchronization of a generator. We understood that synchronizing a generator includes matching of the amplitude, frequency, and phase of the three-phase output voltages of the generator with the same parameters of the power system with which the generator is synchronized. For example, power systems have multiple generation units that operate synchronously under a normal operation, in that, frequency, phase, and amplitude of voltages at the terminals of a generator hold a fixed relationship with the same parameters of the remaining generators in the power system. Before a generator can be connected to an electric power system, we understood the frequency, phase, and amplitude of the voltages at its bus need to be matched, i.e., synchronized, with those of the power system at the point of interconnection. Once, the synchronization parameters are matched within a desired tolerance, the generator breaker can be closed. Any mismatch in the synchronization parameters after the connection of a generation results in undesired transients and disruption of the system. Such undesired transients and disruption can lead to added expense, safety relates incidents and/or potential failure of mechanical components of the power system.

Embodiments of the present disclosure are based on the realization we can achieve fast synchronization for two grids under the support of one or more battery energy storage systems. Each grid includes at least a synchronous generator that is equipped with a primary controller and a secondary controller. Either the first grid and/or the second grid can be connected to the fast synchronous machine, which consists of the grid-imposed power converters and battery energy storage system (BESS).

The grid-imposed frequency voltage source converter can be designed with a power source to automatically provide the desired amount of power to the grid. The design does not necessarily require the usage of a transformer, which can directly connect the converter with an AC grid.

The battery energy storage system can be connected to the DC side of the voltage source converter, which supplies energy to the grid. At least one criteria for selecting an appropriate battery can be provided based the analysis of the dynamic voltage and current responses of batteries, among other things.

According to the present disclosure, the fast synchronization of the frequency and phase can be achieved through active participation of the battery based voltage source converter(s). An automatic power compensation controller can be designed to actively adjust the balance between system mechanical and electrical power outputs, which has the effect of stabilizing the system frequency to the desired value. Using this design, the synchronization time can be significantly decreased, for example, it might only take one tenths of traditional synchronization time to close the switch between two grid systems, and the in-rush current is constrained between two grids, which can further protect the system from breakdown.

For example, we can supply a first (maximum) amount of power until differences between frequencies is less than a first threshold. Then, supply a smaller amount of power until (1) the difference between frequencies is less than a second threshold, or (2) the difference between phases is less than a third threshold. The first amount of compensation power is determined for achieving a fast frequency compensation at a speed up to the discharging/charging capacity of battery and the allowed frequency acceleration/de-acceleration for system equipment safety. Different than passive phase matching used by the traditional method, the second amount of compensation power is determined for compensating the difference between system mechanical power and electrical power to maintain a reasonable frequency deviation for effectively reducing the phase deviation between two grids.

Examples of some of methods and systems of the present disclosure, can include a power system having a first grid with at least one generator that has first power flow parameters and a second grid including at least one generator having second power flow parameters. The power system can have a breaker installed at a point of common coupling between the first grid and the second grid. In an open position the breaker separates the first grid from the second grid, and in a close position connects the first grid with the second grid. Sensors can be positioned on both sides of the point of common coupling to continually determine the power flow parameters for the first and second grid. The power flow parameters for the first and the second grid can include a frequency and a phase. However, it is contemplated that the power flow parameters can include a phase angle, a frequency, a voltage magnitude and a phase sequence. Further, a power source can be used to supply power to either the first grid or the second grid, depending upon how the system is configured. A controller can be used that is placed in communication with the sensors and the power source, that iteratively controls the power source to supply a first amount of power based on continually determining a frequency mismatch between the first grid and the second grid, until a first predetermined condition is met. Then, the controller determines if the first grid and the second grid have reached a second predetermined condition of at least phase mismatches and the frequencies mismatches of the first and the second grid. If not, the control can iteratively control the power source to supply a second amount of power until the second predetermined condition is met. Then, breaker can change position from the open position to the close position, when the second predetermined condition is met, as determined by the controller.

According to an embodiment of the disclosure, a power system includes a first grid including a first generator having first power flow parameters and a second grid including a second generator having second power flow parameters. A breaker installed at a point of common coupling between the first grid and the second grid. Wherein the breaker in an open position separates the first grid from the second grid, and in a close position connects the first grid with the second grid. A first sensor located on a side of the point of the common coupling for continually determining the power flow parameters of the first grid. A second sensor located on an other side of the point of the common coupling for continually determining the power flow parameters of the second grid. Wherein the power flow parameters for the first and the second grid are indicative of at least a frequency and a phase. A power source for supplying power to either the first grid or the second grid. A controller in communication with the sensors and the power source, is configure to: iteratively control the power source to supply a first amount of power based on continually determining a frequency mismatch between the first grid and the second grid, until a first predetermined condition is met; and determine if the first grid and the second grid have reached a second predetermined condition of at least phase mismatches and the frequencies mismatches of the first and the second grid, if not, iteratively control the power source to supply a second amount of power until the second predetermined condition is met. Wherein the breaker changes position from the open position to the close position, when the second predetermined condition is met.

According to another embodiment of the disclosure, a synchronizer for a power system having a first grid having a first generator with first power flow parameters, and a second grid having a second generator with second power flow parameters. A breaker installed at a point of common coupling between the first grid and the second grid. Wherein the breaker in an open position separates the first grid from the second grid, and in a close position connects the first grid with the second grid. The synchronizer including a first sensor located on a side of the point of the common coupling for continually determining the power flow parameters of the first grid. A second sensor located on an other side of the point of the common coupling for continually determining the power flow parameters of the second grid. Wherein the power flow parameters of the first and the second grid are indicative of at least a frequency and a phase. A power source for supplying power to either the first grid or the second grid. A controller in communication with the sensors and the power source, is configure to: iteratively control the power source to supply a first amount of power based on continually determining a frequency mismatch between the first grid and the second grid, until a first predetermined condition is met; and determine if the first grid and the second grid have reached a second predetermined condition of at least phase mismatches and the frequencies mismatches of the first and the second grid, if not, iteratively control the power source to supply a second amount of power until the second predetermined condition is met. Wherein the breaker changes position from the open position to the close position, when the second predetermined condition is met.

According to another embodiment of the disclosure, synchronizer for a power system having a generator having first power flow parameters, a grid having a grid generator having second power flow parameters. A breaker installed at a point of common coupling between the generator and the grid. Wherein the breaker in an open position separates the generator from the grid, and in a close position connects the generator with the grid. The synchronizer including a first sensor located on a side of the point of the common coupling for continually determining power flow parameters of the generator. A second sensor located on an other side of the point of the common coupling for continually determining power flow parameters of the grid. Wherein the power flow parameters for the generator and the grid are indicative of at least a frequency and a phase angle. A power source for supplying power to either the generator or the grid. A controller in communication with the sensors and the power source, is configure to: iteratively control the power source to supply a first amount of power based on continually determining a frequency mismatch between the first grid and the second grid, until a first predetermined condition is met; and determine if the first grid and the second grid have reached a second predetermined condition of at least phase mismatches and the frequencies mismatches of the first and the second grid, if not, iteratively control the power source to supply a second amount of power until the second predetermined condition is met. Wherein the breaker changes position from the open position to the close position, when the second predetermined condition is met.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 1D is a schematic block diagram of step 130 of the fast synchronization system, according to some embodiments of the present disclosure;

FIG. 5A illustrates two systems to be connected; FIG. 5B illustrates the configuration of the fast synchronization machine; FIG. 5C illustrates the detection and control block; FIG. 5D illustrates the phase lock loop (PLL) and signal transformation; and FIG. 5E illustrates the current control of the voltage source convertor.

Figure 1A:
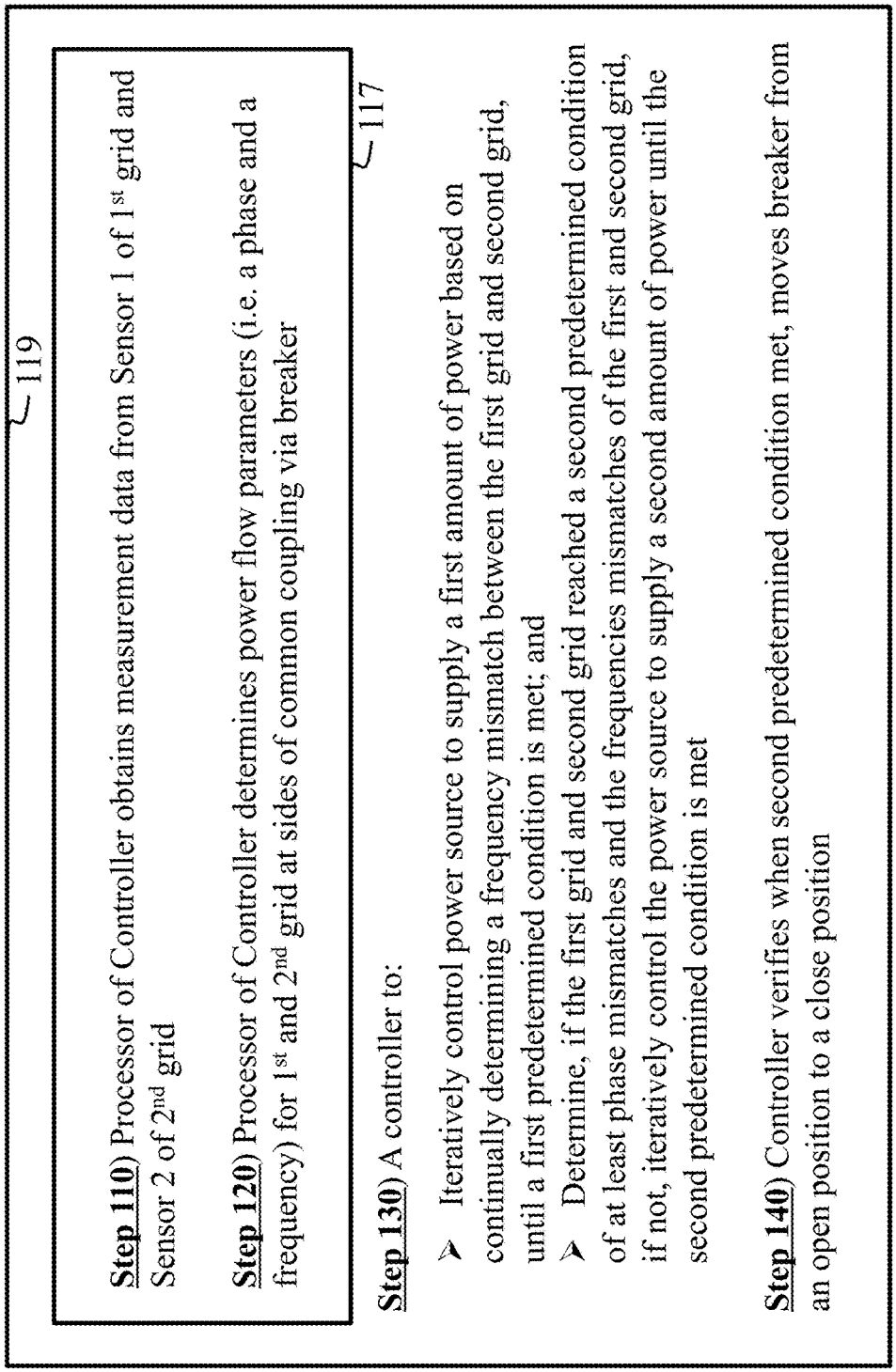
FIG. 1A is a schematic block diagram of steps of the fast synchronization system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to controlling generation units in electric power systems, and in particular to design a grid fast synchronization machine with battery energy storage system.

The embodiments of the present disclosure are based on several realizations that included using a controller in communication with sensors and a power source, to iteratively control the power source to supply a first amount of power, and continually determine a frequency mismatch between a first power grid and a second power grid, until a first predetermined condition can be met. Further, we realized that we could introduce a second predetermined condition of phase mismatches and the frequencies mismatches for the first and the second power grid. Wherein we monitor the first power grid and the power second grid to see if the second predetermined condition of the phase mismatches and the frequencies mismatches we met, and if not, iteratively control the power source to supply a second amount of power until the second predetermined condition is met. Wherein, then a breaker can change position from an open position to a close position when the second predetermined condition is met.

The present disclosure addresses how to close a switch that connects the grids, timely so as to provide for fast synchronization, and to avoid grid collapse. We realized through extensive experimentation, the problem we needed to solve included how to perform synchronization between generators or power grids before connecting them into a common grid. We also discovered that the phase along with the frequency needs to be incorporated in our solution to fast synchronization.

Specifically, we discovered that instead of replacing the synchronization device with a power device having faster dynamics, we needed to supplement conventional synchronization with an additional synchronization boost using a power source, i.e. a DC power storage device. In such a manner, the legacy of conventional approach is preserved, while synchronization time can be reduced. For example, we figured out that to avoid communication between the generator and the DC power storage device, we can assume that the generator is behaving in a prudent way, i.e., trying to synchronize the grids. Such that, by using that assumption allows us to perform synchronization iteratively. The DC power storage device can then measure power flow parameters at both sides of the point of common coupling and perform energy charge/discharge at each iteration, based on the result of the measurements without fear to contradict and/or dis-balance the generator control.

However, we came to the realization that due to iterative nature of control, we cannot determine the required charge/discharge, and thus need to separate the control in two stages: (1) synchronization of frequencies and (2) synchronization of phases. Which is because frequency synchronization can be done more rapidly than phase synchronization, i.e. initial rough tuning and final fine tuning. To better understand synchronization and grasp our realizations, it is important to comprehend the dynamics of synchronization of a generator.

We understood that synchronizing a generator includes matching of the amplitude, frequency, and phase of the three-phase output voltages of the generator with the same parameters of the power system with which the generator is synchronized. For example, power systems have multiple generation units that operate synchronously under a normal operation, in that, frequency, phase, and amplitude of voltages at the terminals of a generator hold a fixed relationship with the same parameters of the remaining generators in the power system. Before a generator can be connected to an electric power system, we understood the frequency, phase, and amplitude of the voltages at its bus need to be matched, i.e., synchronized, with those of the power system at the point of interconnection. Once, the synchronization parameters are matched within a desired tolerance, the generator breaker can be closed. Any mismatch in the synchronization parameters after the connection of a generation results in undesired transients and disruption of the system. Such undesired transients and disruption can lead to added expense, safety relates incidents and/or potential failure of mechanical components of the power system.

Embodiments of the present disclosure are based upon the realization we can achieve fast synchronization for two grids under the support of battery energy storage systems. Each grid may have at least one synchronous generator equipped with a primary controller and a secondary controller. Either the first grid and/or the second grid can be connected to the fast synchronous machine, which consists of the grid-imposed power converters and battery energy storage system (BESS).

The grid-imposed frequency voltage source converter can be designed to automatically provide the desired amount of power to the synchronous generator. The design does not require the usage of a transformer, which can directly connect the power converter with AC grid. The battery energy storage system can be connected to the DC side of the power converter, which supplies energy to the grid. At least one criteria for selecting an appropriate battery can be provided based the analysis of the dynamic voltage and current responses of batteries, among other things.

According to the present disclosure, the fast synchronization of the frequency and phase are achieved through active participation of the battery based power converter(s). The automatic power compensation controller can be designed to adjust the balance between the system mechanical power output and the system electrical power output, which has the effect of stabilizing the system frequency to the desired value. Using this design, the synchronization time can be significantly decreased, for example, it might only take one tenth of traditional synchronization time to close the switch between two grid systems, and the in-rush current is constrained between two grids, which can further protect the system from breakdown. For example, we can supply a first (maximum) amount of power until differences between frequencies is less than a first threshold. Then, supply a smaller amount of power (function of a difference between phases) until (1) the difference between frequencies is less than a second threshold, or (2) the difference between phases is less than a third threshold. The first amount of compensation power is determined for achieving a fast frequency compensation at a speed up to the discharging/charging capacity of battery and the allowed frequency acceleration/de-acceleration for system equipment safety. Different than passive phase matching used by the traditional method, the second amount of compensation power is determined for compensating the difference between system mechanical power and electrical power to maintain a reasonable frequency deviation for effectively reducing the phase deviation between two grids.

Examples of some of methods and systems of the present disclosure, can include a power system having a first grid with at least one generator that has first power flow parameters and a second grid including at least one generator having second power flow parameters. The power system can have a breaker installed at a point of common coupling between the first grid and the second grid. In an open position the breaker separates the first grid from the second grid, and in a close position connects the first grid with the second grid. Sensors can be positioned on both sides of the point of common coupling to continually determine the power flow parameters for the first and second grid. The power flow parameters for the first and the second grid can include a frequency and a phase. However, it is contemplated that the power flow parameters can include a phase angle, a frequency, a voltage magnitude and a phase sequence. Further, a power source can be used to supply power to either the first grid or the second grid, depending upon how the system is configured. A controller can be used that is placed in communication with the sensors and the power source, that iteratively controls the power source to supply a first amount of power based on continually determining a frequency mismatch between the first grid and the second grid, until a first predetermined condition is met. Then, the controller determines if the first grid and the second grid have reached a second predetermined condition of at least phase mismatches and the frequencies mismatches of the first and the second grid. If not, the control can iteratively control the power source to supply a second amount of power until the second predetermined condition is met. Then, breaker can change position from the open position to the close position, when the second predetermined condition is met, as determined by the controller.

FIG. 1A is a schematic block diagram of steps of the fast synchronization system, according to some embodiments of the present disclosure. The fast synchronization 100 having a controller 119 and at least one processor 117, wherein the processor provides for steps 110 and 120 and the controller steps 130 and 140.

Step 110 includes the processor continuously obtaining measurement data from a first sensor for a first grid and a second sensor for a second grid. Wherein the first grid has power flow parameters and the second grid has power flow parameters. A breaker is installed at a point of common coupling between the first grid and the second grid. Wherein the breaker in an open position separates the first grid from the second grid, and in a close position connects the first grid with the second grid.

Step 120 includes the processor continually determining power flow parameters for first grid and second grid at sides of the common coupling via the breaker, wherein the power flow parameters for the first and the second grid are indicative of at least a phase and a frequency.

Step 130 includes the controller in communication with the sensors and the power source that is configure to:

iteratively control the power source to supply a first amount of power based on continually determining a frequency mismatch between the first grid and the second grid, until a first predetermined condition is met; and determine if the first grid and the second grid have reached a second predetermined condition of at least phase mismatches and the frequencies mismatches of the first and the second grid, if not, iteratively control the power source to supply a second amount of power until the second predetermined condition is met.

Step 140 includes the controller verifying when the second predetermined condition met, then moves breaker from an open position to a close position.

Figure 1B:
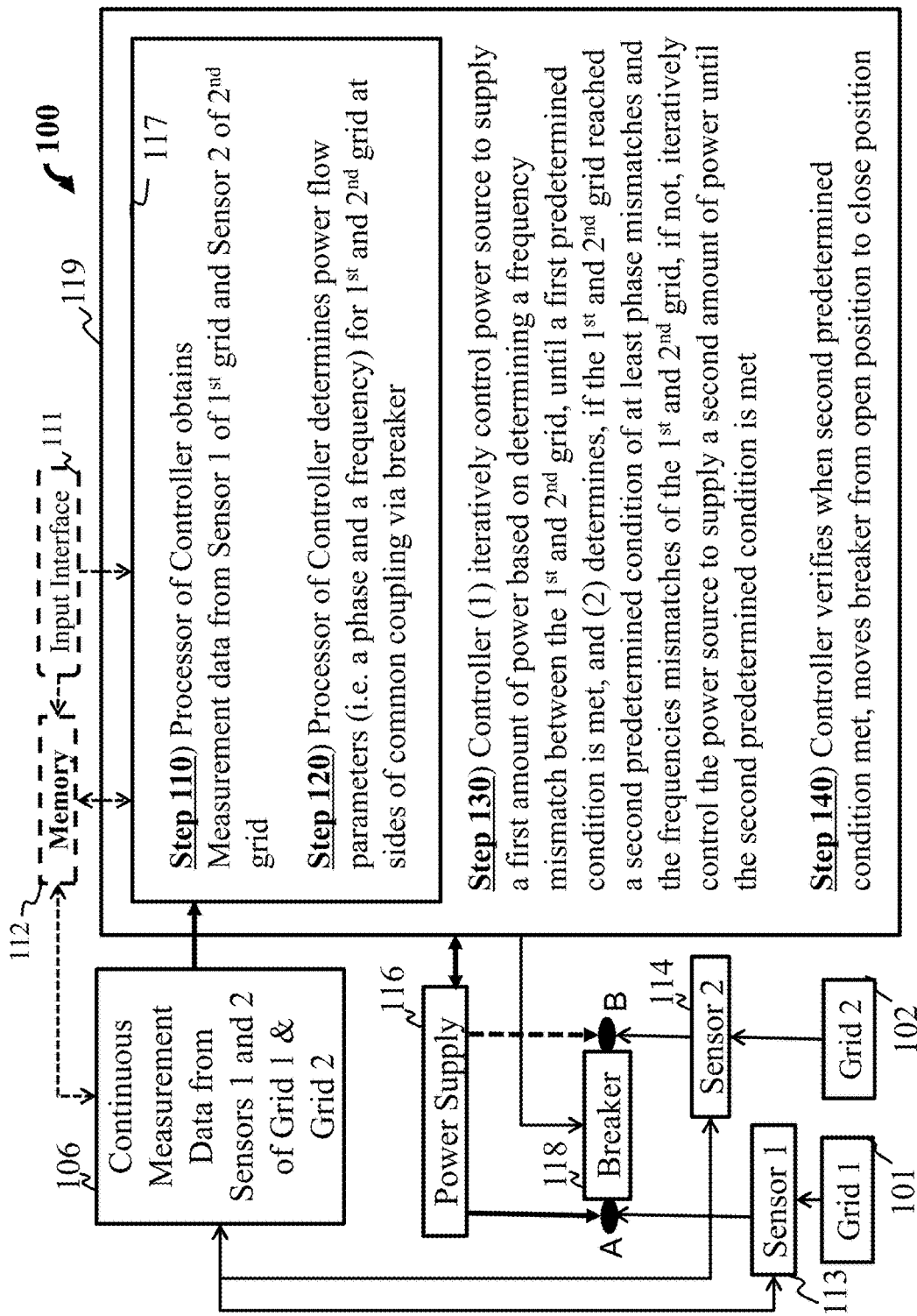
FIG. 1B is a schematic illustrating steps of the fast synchronization system along with components of the system, according to some embodiments of the present disclosure.

FIG. 1B is a schematic illustrating steps of the fast synchronization system of FIG. 1A, along with components of the system, according to some embodiments of the present disclosure. The fast synchronization system 100 includes a first power grid 101 having first power flow parameters and a second power grid 102 having second power flow parameters. Wherein step 110 continuously obtains measurement data 106 from sensors 113, 114 by the processor 117.

A breaker 118 installed at a point of common coupling A, B between the first power grid 101 and the second power grid 102. Wherein the breaker 118 in an open position separates the first power grid 101 from the second power grid 102, and in a close position connects the first power grid 101 with the second power grid 102.

Still referring to FIG. 1B, the processor 117 continually determines power flow parameters for first and second power grids 101, 102, at sides A, B of common coupling of the breaker 118 (step 120). Wherein a first sensor 113 is located on a side A of the point of the common coupling for continually determining the power flow parameters of the first power grid 101. A second sensor 114 is located on another side B of the point of the common coupling for continually determining the power flow parameters of the second power grid 102. Such that the power flow parameters for the first and the second power grids 101, 102 are indicative of at least a frequency and a phase. Also, a power source 116 supplies power to either the first power grid 101 or the second power grid 102.

The controller 119 of step 130 is in communication with the sensors 113, 114 and the power source 116 and configures to: iteratively control the power source 116 to supply a first amount of power based on continually determining a frequency mismatch between the first grid 101 and the second grid 102, until a first predetermined condition is met; and determine if the first grid 101 and the second grid 102 have reached a second predetermined condition of at least phase mismatches and the frequencies mismatches of the first and the second grid 101, 102, if not, iteratively control the power source 116 to supply a second amount of power until the second predetermined condition is met.

Finally, the controller 119 verifies when the second predetermined condition is met, and then moves the breaker 118 position from the open position to the close position (step 140).

Optionally, the power system 100 can store the continuous measurement data 106 in a computer readable memory 112, wherein the computer readable memory is in communication with the controller 119 and processor 117. Further, it is possible an input interface 111 can be in communication with the memory 112 and the controller 119 and processor 117. For example, a user via a user interface of the input interface 111 may input predetermined conditions, i.e. the first predetermined condition.

Figure 1C:
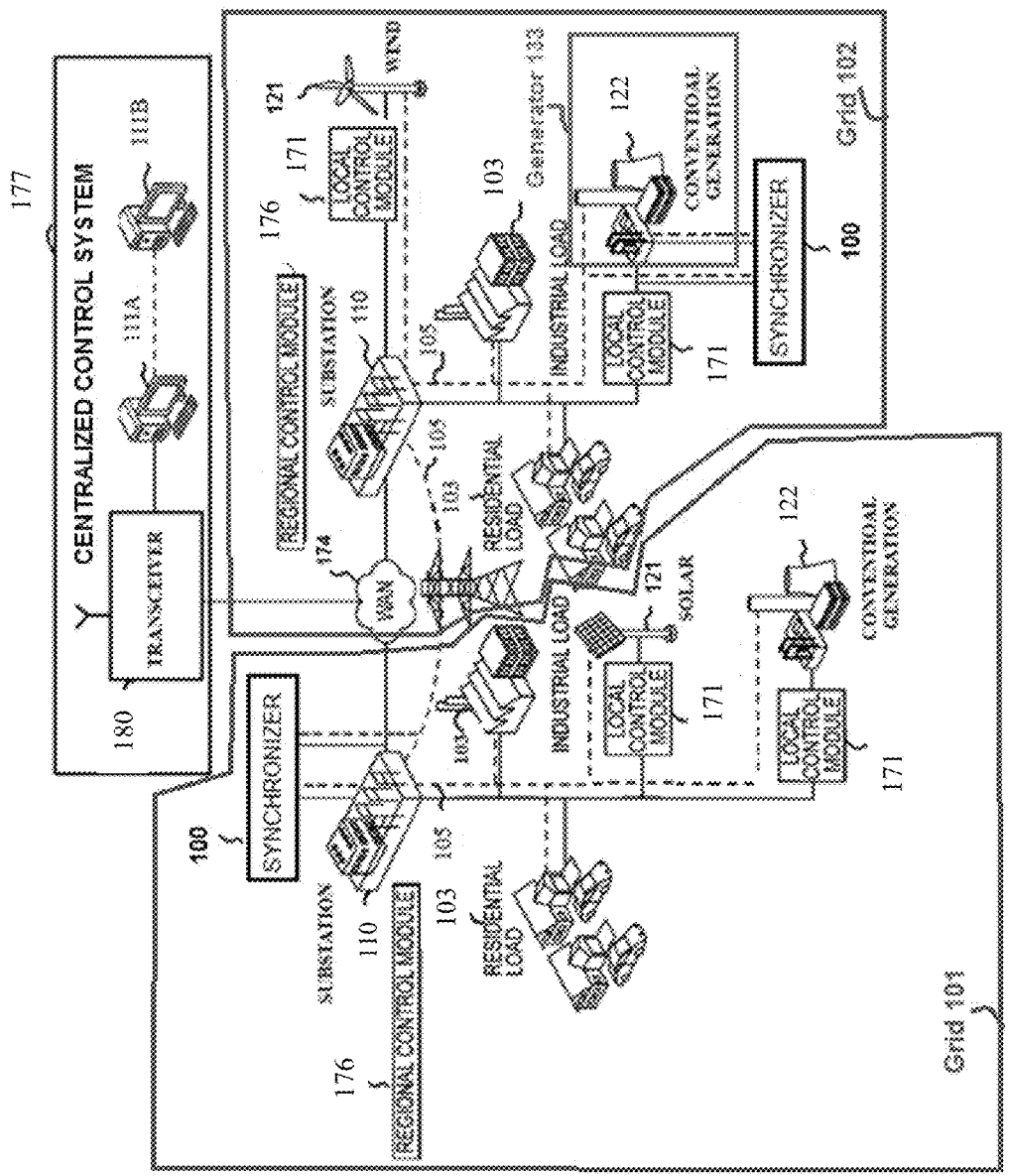
FIG. 1C is a schematic illustrating the fast synchronization system positioned between at least two power grid systems, or a generator and a power grid according to some embodiment of the present disclosure.

FIG. 1C shows a schematic of an exemplar power system using batter energy storage system based synchronizers, according to some embodiment of the present disclosure. The power sources of the exemplar power system include the conventional power generation facilities 122, and the renewable source of the energy 121, such as wind turbine farms and solar arrays. The power consumers of the exemplar power system include the industrial/commercial loads 103 representative of industrial plant or large commercial enterprises, and/or the residential loads 103 representative of residential customers. The power plants, 121 and 122 are coupled with the power consumers, 103 through the substations 110. Associated with substations 110 is a regional control module 176.

The regional control module manages power production, distribution, and consumption within its region. Different regions are interconnected with transmission lines 105 (shown in dashed lines), and the transmission lines can be closed or opened through the circuit breakers located in the substations 110. Each regional control module 176 is communicatively coupled to a centralized control system 177 via, e.g., a wide area network 174. The power plant interfaces with the regional grid via a local control module 171. The local control module 171 can standardize control command responses for generator on/off status change and generation level adjustments issued by regional control module 176 or the centralized control system 177.

Still referring to FIG. 1C, the control system 177 includes a transceiver 180 for exchanging data between the control system and regional control modules 176 via the network 174. Also, control system 177 includes one or several processors 111A and 111B to manage the operation and control of the power system. The control system 177 is operable to manage the interaction of several regional control modules 176 and the power plants under their control. To that end, the centralized control system 177 make decisions for regional grid interconnection or major generator connection to the grid. The regional control module 176 makes the decision for connecting local stand-alone operated generators into its regional grid. For example, the control system 177 can issue a command to the regional control module 176 to connect its controlled regional grid with an adjacent regional grid. The synchronizers described by some embodiments of the disclosure are used to support fast synchronization of two energized grids or a generator with a grid.

Still referring to FIG. 1C, the synchronizer 100 can be installed at a substation 110 for supporting the synchronization of grid 101 with grid 102. It uses the local measurements collected from both sides of the circuit breaker between grid 1 and grid 2 to simultaneously regulate the phase and frequency differences between two grids during the synchronization process. When an interconnection command is issued by the centralized control system, the synchronizer 100 activates the synchronizing process, and close the circuit breaker at the substation 110 when a predetermined threshold is met for differences of power flow parameters between grid 1 and grid 2. The power flow parameters may include frequency, phase angle, voltage amplitude, and phase sequence.

The synchronizer 100 can also be installed at a step-up station of a power plant 122 for connecting a generator 133 of the power plant to the regional grid, grid 102. The power flow parameters at both sides of generator breaker between the generator and the grid are used to regulate the synchronization of the generator 133 with the grid 102. The grid reconfiguration command can be made either by the regional control module 176, or by the centralized control system 177 when there is a need in the power system, such as sudden load changes.

FIG. 1D is a schematic block diagram of step 130 of the fast synchronization system, according to some embodiments of the present disclosure. This disclosure actively regulates active power supplied to the first grid or the second grid based on both frequency mismatch and phase mismatch between the first grid and the second grid. The controller consists at least a phase and frequency detection block, an automatic power compensation controller, and a dq-frame current controller of a convertor. The controller synchronizes the phases and the frequencies of the first and the second grid sequentially through the following steps:

First step of iteratively controlling the power source through the dq-current controller to supply a first amount of power determined by the automatic power compensation controller based on continually determining a frequency mismatch between the first grid and second grid through the detection block, until a first predetermined condition is met; and Second step of determining, if the first grid and second grid reached a second predetermined condition of at least phase mismatches and the frequencies mismatches of the first and second grid, if not, iteratively control the power source through the dq-current controller to supply a second amount of power determined by the automatic power compensation controller until the second predetermined condition is met.

The compensated power from the power source at the first step is to cause frequency change at desired direction as quick as possible. In comparison, the goal of power compensation at the second step is to maintain the frequency unchanged for causing phase changing at a reasonable speed.

Figure 2:
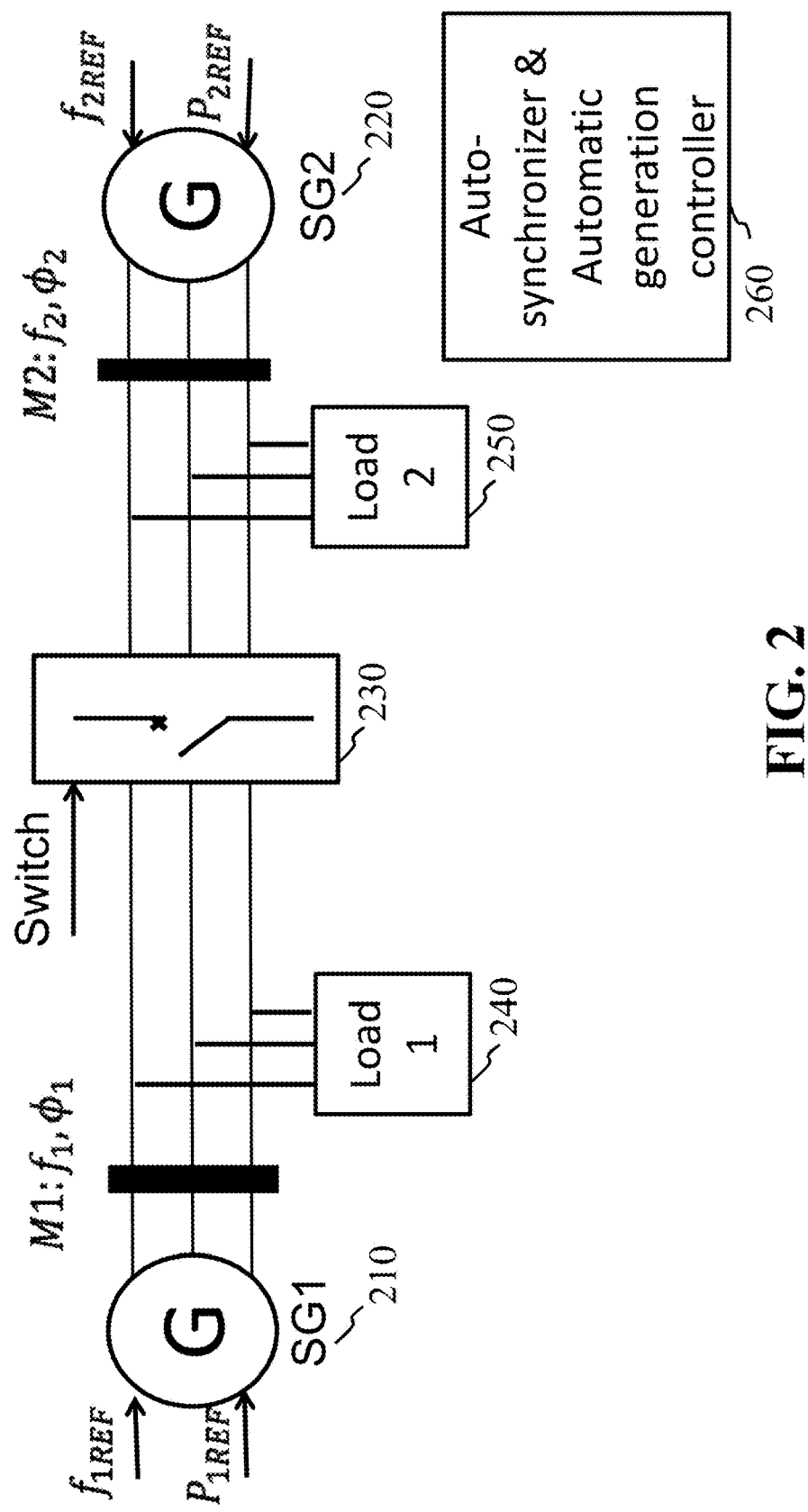
FIG. 2 is a prior art schematic of a traditional synchronization mechanism between two grids, according to some embodiments of the present disclosure.

Regarding FIG. 2 (prior art) is provided to better understand aspects of the present disclosure, including operating procedures for fast synchronization of the fast synchronization machine. A traditional approach to synchronization between two grids, can include four criteria that should be satisfied before closing the switch. They are grid frequency, phase difference, phase sequence and voltage magnitude. The first grid of FIG. 2 is located at the one side of switch 230, which includes a synchronous generator, SG1 210, and a load 240. The second grid is located at the other side of switch 230, which includes a synchronous generator, SG2 220, and a load 250. Each grid has a sensor located at one side of the switch to measure the frequency and phase of the grid. The frequency and phase can be adjusted through an automatic power generation block 260 through adjusting the reference frequency and reference active power of the grid. The automatic power generation block 260 is implemented with primary and secondary controllers, which reflects the dynamic responses of the governor and system frequency. With the help of automatic generation controller 260, the frequency of the synchronous machine will approach the preset reference value in steady-state. The auto-synchronizer 260 will measure the frequency and phase difference between two systems, and close the switch if they are close enough.

According to the present disclosure, we are only addressing the synchronization of grid frequency and phase difference, since they are more difficult to achieve and have a superior impact on the system performance, among other things.

Figure 3:
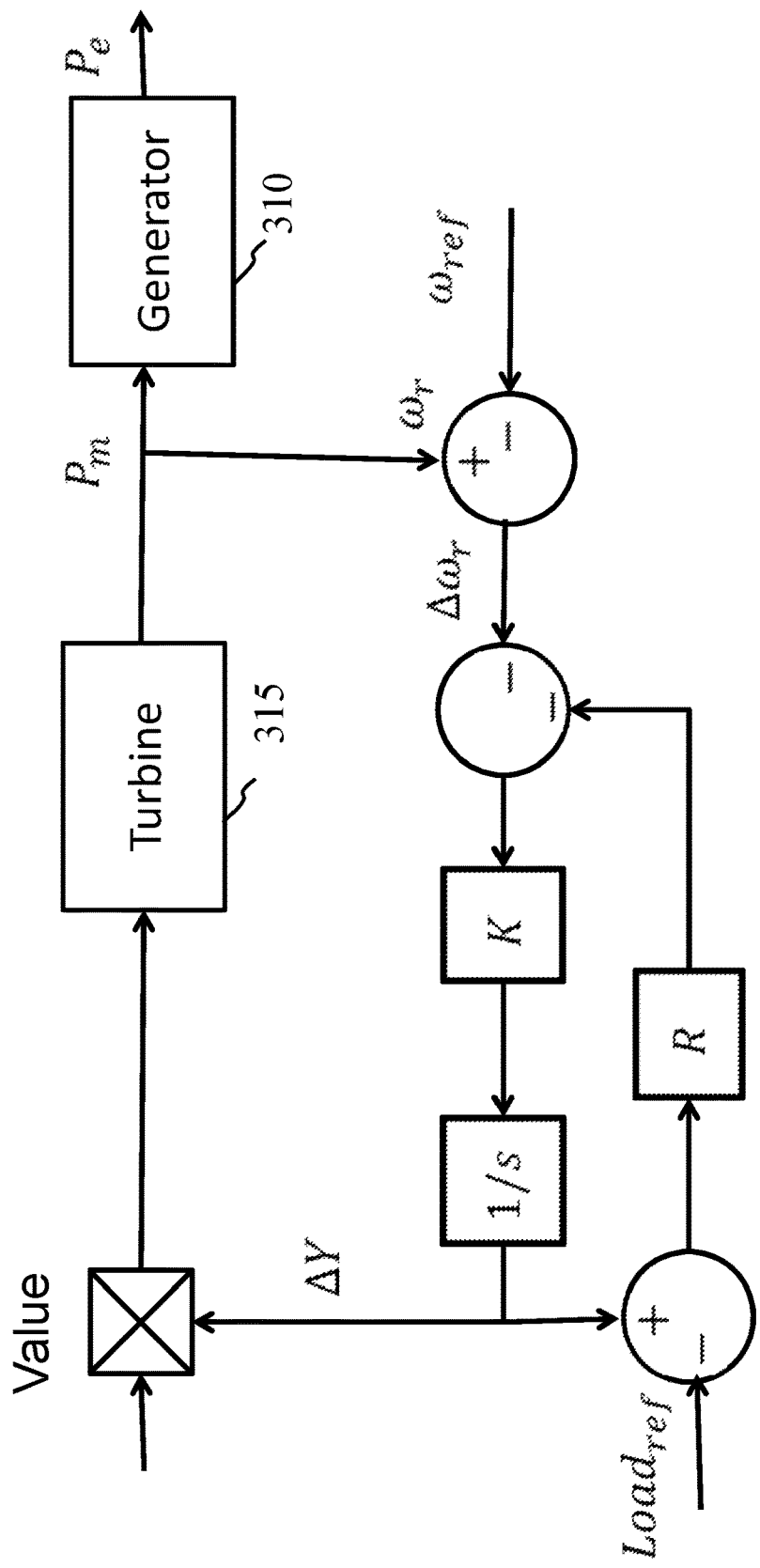
FIG. 3 is a schematic of a governor and a turbine, according to some embodiments of the present disclosure.

FIG. 3 is a schematic of a governor of the generator 310 and a turbine 315, according to some embodiments of the present disclosure. Wherein $\Delta Y$ is the control signal of valve/gate position, $P_m$ is the mechanical power output of the turbine, $P_e$ is the electrical power output of the generator, $\Delta \omega_r$ is the rotor speed difference between the actual value and reference value. This schematic includes the effects of droop-characteristic, turbine dynamics and generator dynamics. The droop characteristic is described as follows:

$$\Delta P = \frac{\Delta f}{R}, \quad (1)$$

where, R is determined as the ratio of speed deviation ($\Delta \omega_r$) or frequency deviation ($\Delta f$) to the change in the valve/gate position ($\Delta Y$) or power output ($\Delta P$). This feature indicates that the increase or decrease of electrical power on the load side can lead to corresponding amount of change in the system frequency at steady-state. Accordingly, system frequency can be modified through changing the output electrical power. The generator dynamics can be expressed as:

$$J \frac{d\omega}{dt} = \frac{P_m - P_e}{\omega_0} - D_e \omega, \quad (2)$$

where, $D_e$ is the coefficient of friction loss of the synchronous generator, $P_m$ is the mechanical power at the turbine output, $P_e$ is the electrical power at the generator output, J is the moment of inertia, which stands for the ability to resist changes in the rotational speed, $\omega$ and $\omega_0$ represents the angular and synchronous speed of the generator, respectively. Neglecting the effect of $D_e$, Eq. 2 can be simplified as $$J \frac{d\omega}{dt} = \frac{P_m - P_e}{\omega_0}. \quad (3)$$

The dynamics of generator can be utilized to actively adjust the speed of synchronous generator. The fast synchronization machine is designed based on Eq. 3 and implemented with an automatic power compensation controller.

Using traditional synchronization methods, the synchronization process for the grids in FIG. 2 can be implemented through following steps:

Step 1: regulating the frequency reference of the second grid, $f_{2REF}$ to approach the normal operating frequency of the first grid, SG1, $f_{1REF}$.

Step 2: performing frequency matching according to dynamic characteristics of primary and secondary controllers. In this step, the frequency of the second grid, $f_2$ is gradually converging to its steady state.

However, regarding step 2, for the sake of phase synchronization, a small frequency deviation is remained between the first grid and the second grid at the end of this step.

Step 3: performing the phase matching. The auto-synchronizer monitors the phase difference between two grids and closes the switch if the phase deviation satisfies the required limit.

Step 4: After closing the switch, while aligning $f_{2REF}$ with nominal frequency $f_{1REF}$, monitoring the frequency transient response and in-rush current within two grids.

FIG. 3 is a graph illustrating the frequency responses of generators in FIG. 2 during a traditional synchronization process. As shown in FIG. 3, using traditional method, the switch can be closed around 70 seconds, and the grid frequency will arrive at its steady state around 200 seconds.

Such synchronization speed might be tolerable when system events could be well predicted or prepared, and the synchronization windows were long enough for the primary and secondary controllers completing required actions. However, with the increasing penetration of renewables, future power grids are more vulnerable to resist sudden load/generation changes or other emergencies due to lesser inertia. If a required grid reconfiguration could not be achieved in a timely manner, the stability and efficiency of power systems might not be maintained. Therefore, fast synchronization is of critical importance for the stable and efficient operation of future power grids.

Design of Fast Synchronization Machine

The present disclosure achieves fast synchronization for two grids with the support of battery energy storage systems (BESS). According to Eq. (2), the rotor speed of a synchronous generator can be adjusted by changing the mechanical inputs into the generator and electrical outputs from the generator. Because BESS has the capability to absorb powers from or supply powers to the grid, it can be used to adjust the power injections of a generator or grid for adjusting the corresponding rotor speed or grid frequency. Therefore, a fast synchronization can be achieved through quickly adjusting absorbing or supplying powers of BESS if it is connected with the grid. The present disclosures use a novel method to realize fast synchronization between two AC grids through a fast synchronization machine, which integrates a BESS with a grid-imposed voltage source power converter. The fast synchronization machine can extract or absorb desired amount of real and reactive power from or to the AC grid. Therefore, the frequency and phase of the AC grid can be regulated in a timely manner through power compensation from the fast synchronization machine.

Figure 5A:
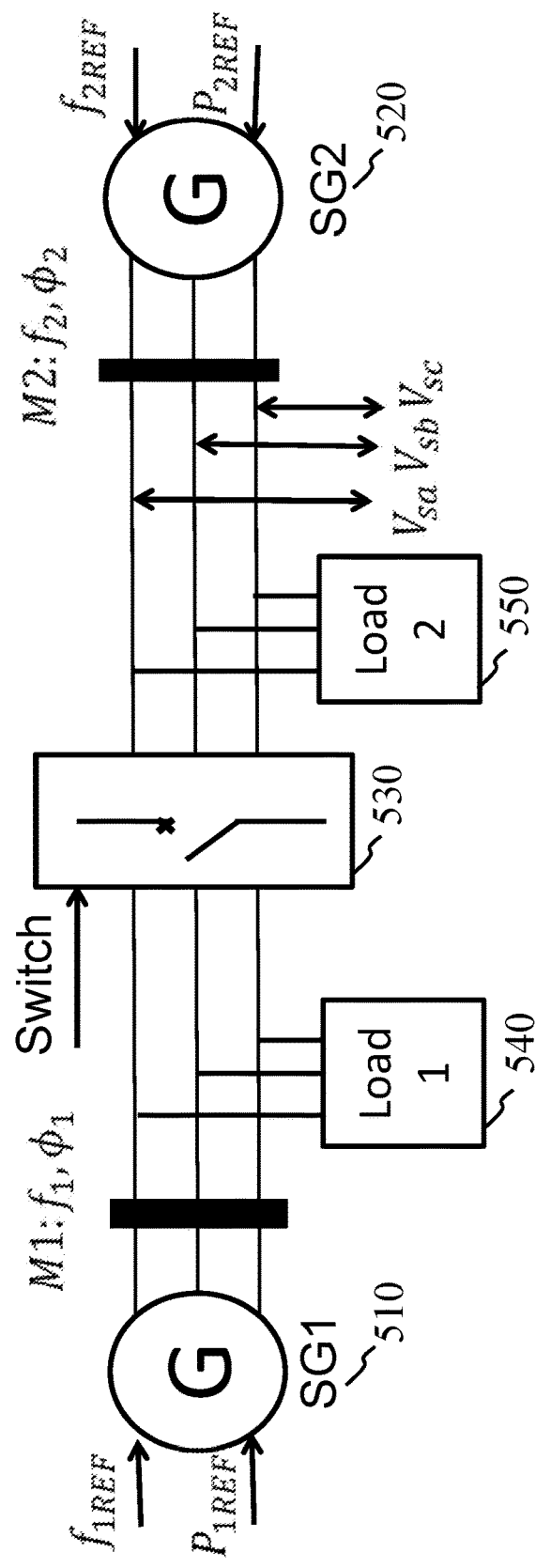
FIGS. 5A, 5B, 5C, 5D and 5E are schematics of a fast synchronization machine, according to some embodiments of the present disclosure.

FIGS. 5A, 5B, 5C, 5D and 5E are schematics of a fast synchronization machine, according to some embodiments of the present disclosure. FIG. 5A illustrates two grids to be connected, in which the first grid includes a synchronous generator SG1, 510 and a load 540, the second grid includes a synchronous generator SG2, 520 and a load 550, and the switch 530 is installed at the point of common coupling between the first grid and the second grid. The fast synchronization machine is connected to one of the grids. In FIG. 5A, the fast synchronization machine is connected with the second grid.

Figure 5B:
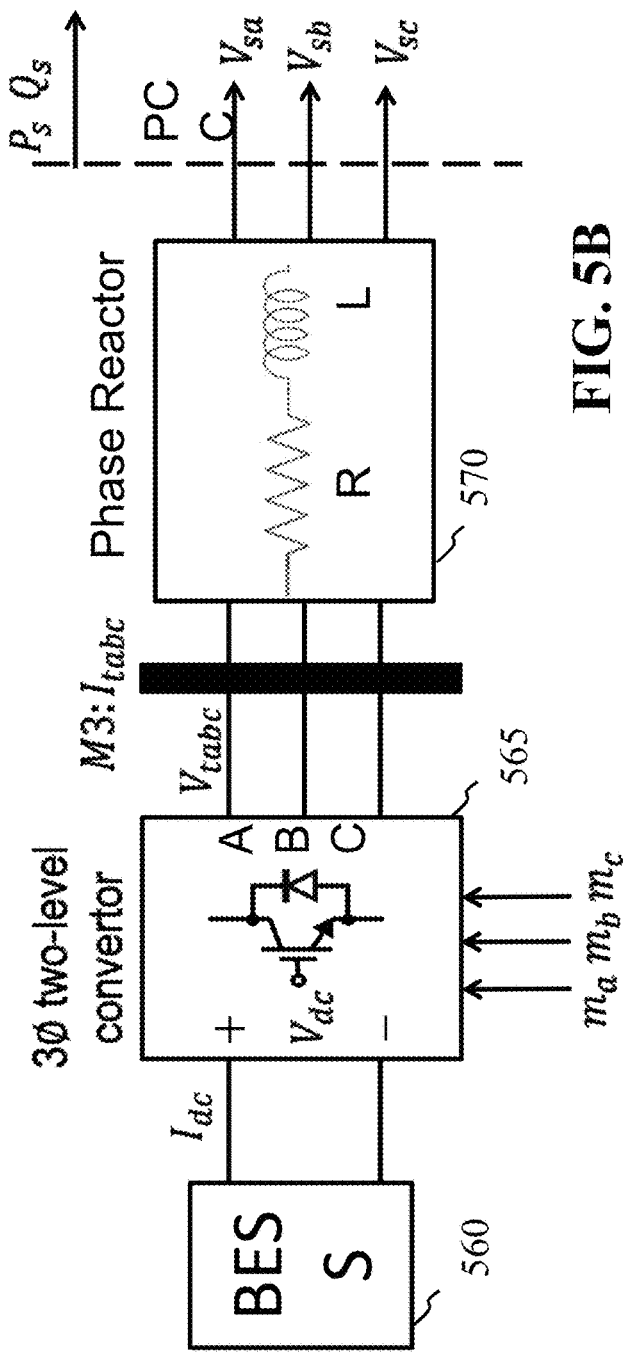

FIG. 5B shows the schematic of a fast synchronization machine consisting of a battery energy storage system (BESS) 560, a two-level voltage source converter 565, and a phase reactor circuit 570. The integration of voltage source converter and BESS can provide required amount of power to the AC grid, which achieves the goal of dynamic power compensation to AC grids. A detection and control block is used to regulate the fast synchronization machine.

Figure 5C:
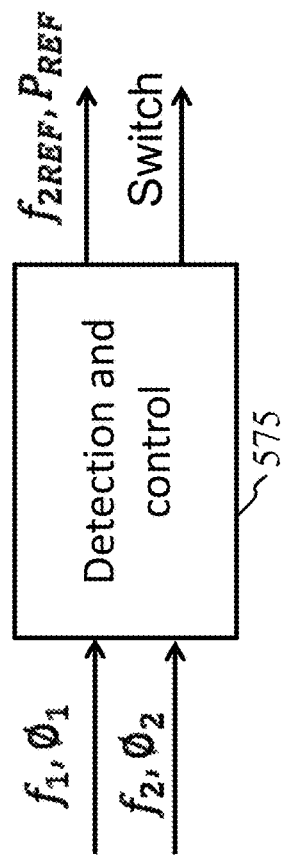

FIG. 5C shows the schematic of the detection and control block 575, which adjust the reference frequency and reference active power for the synchronization machine connected grid, and issues status change command to the switch. The detection and control block includes a phase and frequency detection block, and an automatic power compensation controller.

Figure 5D:
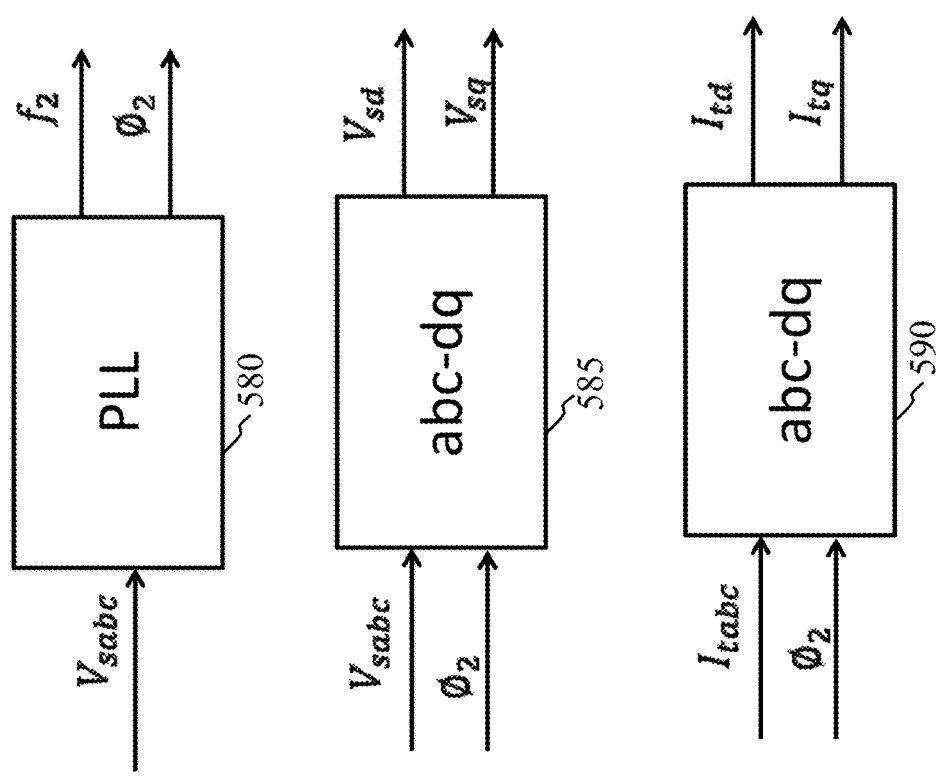

FIG. 5D shows the schematic of phase lock loop (PLL) and signal transformation used for the fast synchronization machine. The phase and frequency of the grid is extracted from the measured three phase voltage of the grid through a phase lock loop (PLL), 580. Using the determined phase, the measured three-phase voltages of the grid and the output currents from the convertor can be converted into dq-frame through a abc-to-dq transformation, 585 and 590. Those dq-frame quantities are used for controlling the outputs of the voltage source convertor in FIG. 5B.

Figure 5E:
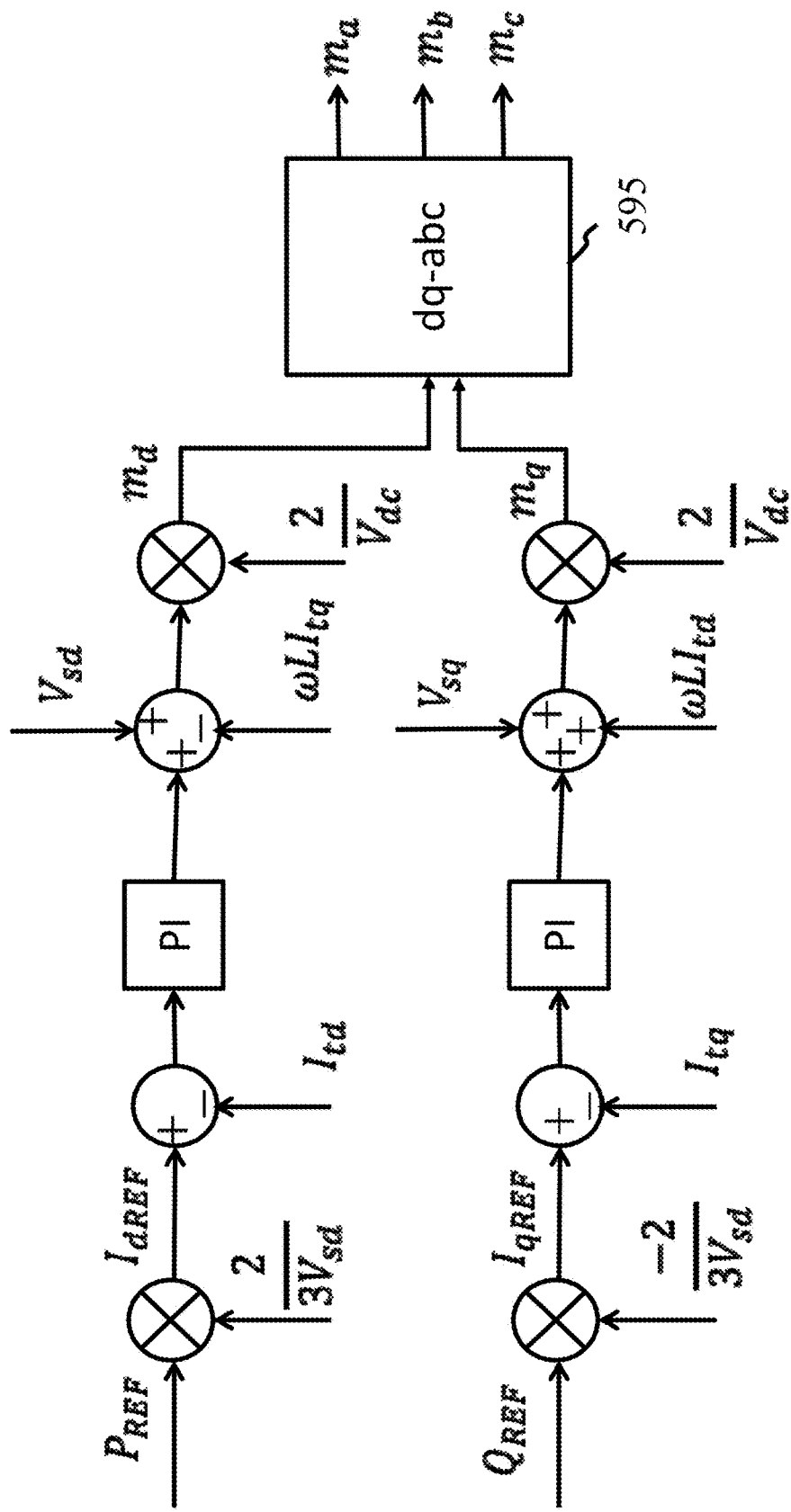

FIG. 5E shows a schematic of phase current controller of the voltage source convertor. The reference powers determined in the detection and control block combined with grid voltages in dq-frame and convertor output currents are used to determine the modulation signals for the convertor in dq-frame. Those modulation signals are further converted into abc-frame to be used for control the output currents and powers of the convertor to the grid, through a dq-to-abc transformation 595.

Modeling of BESS

BESS is an essential part of the fast synchronization machine, which supplies or absorbs energy during synchronization process. Because of the highlighted advantages of high capacity and low cost, a lead-acid battery is widely used in distributed grids. It is assumed that in the present disclosure, the BESS refers to a lead-acid battery. Its discharging and charging dynamics can be modeled as Eq. 4 and Eq. 5, respectively:

$$V_{batt} = E_0 - R \cdot i - K \frac{Q}{Q - it} \cdot (it + i^*) + \text{Exp}(t), \quad (4)$$

$$V_{batt} = E_0 - R \cdot i - K \frac{Q}{it - 0.1 \cdot Q} \cdot i^* - K \frac{Q}{Q - it} \cdot it + \text{Exp}(t), \quad (5)$$

where, $V_{batt}$ is the battery voltage (V), $E_0$ is the battery constant voltage (V), K is the polarization constant (V/Ah), Q is the battery capacity, it=∫idt is the actual battery charge (Ah), R is the internal resistance (Ω), i is the battery current (A), i* is the filtered current (A).

The model is based on the assumptions that the internal resistance is supposed constant during the charge and discharge cycles and does not vary with the amplitude of the current. In addition, the current amplitude of the battery does not change with the battery capacity during nominal operation.

Figure 6:
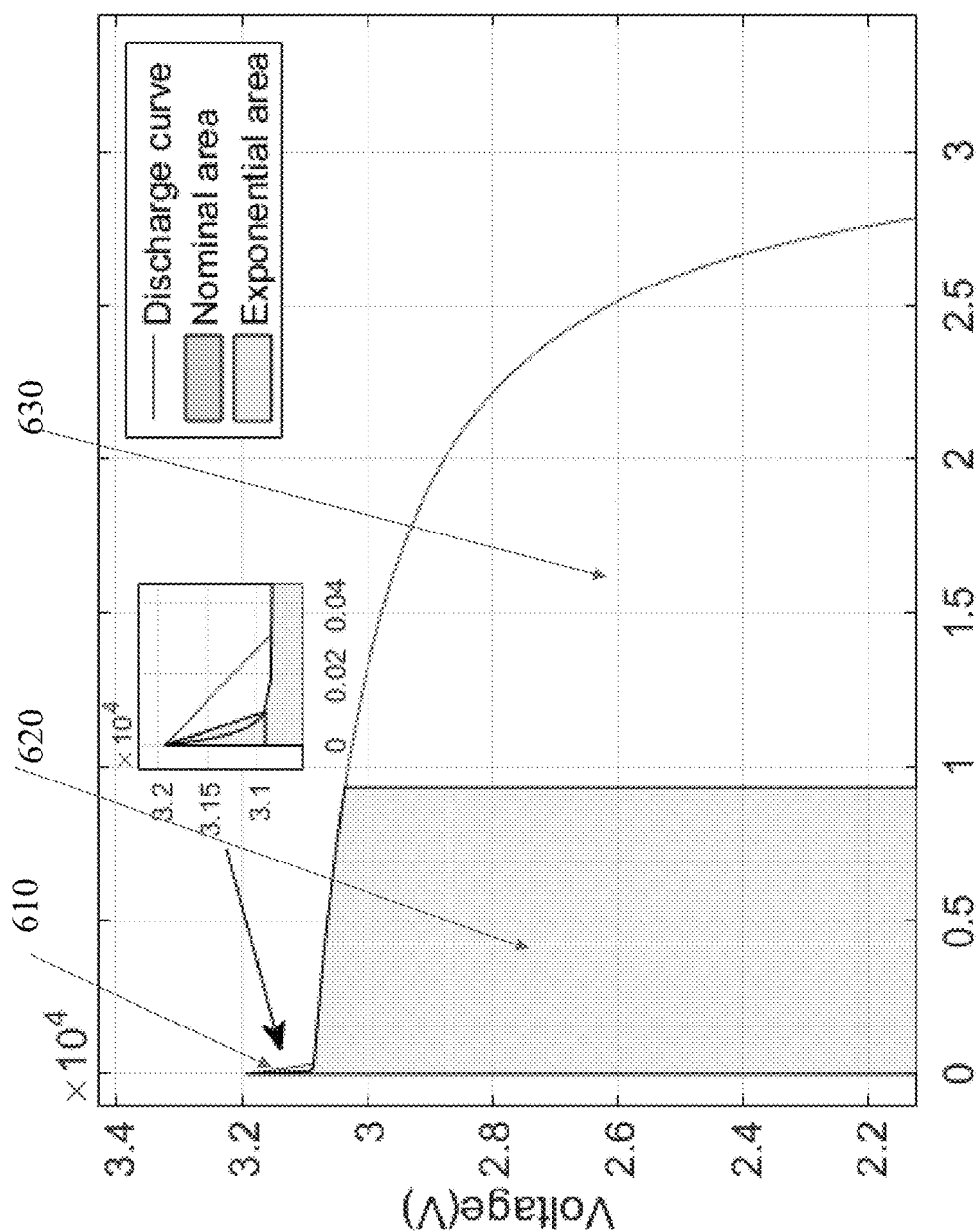
FIG. 6 is a graph illustrating an example of battery nominal discharge characteristic, in order to achieve ideal performance of fast synchronization machine, according to some embodiments of the present disclosure.

FIG. 6 is a graph illustrating an example of battery nominal discharge characteristic, in order to achieve ideal performance of fast synchronization machine, according to some embodiments of the present disclosure. For the discharging process of the battery, several working zones can be classified as shown in FIG. 6. They are exponential area 610, nominal area 620 and depletion zone 630. In order to achieve idea performance of fast synchronization machine, we need to guarantee the battery working in the nominal zone.

In order to meet the power requirements of the fast synchronization machine, the parameters of battery should be carefully selected, for example:

State of charge (SOC) is defined as the percentage of the energy stored in a fully charged battery. In order to keep a stable voltage output, the SOC should be kept between 20% and 90% during the synchronization process.

Battery capacity is the measure of a battery's capability to store and deliver electrical energy and in commonly expressed in units of ampere-hours. Based on the system demands, the battery should have appropriate capacity to finish the synchronization process. Since the synchronization machine only works in a short duration, the battery can be implemented with lower capacity.

Nominal voltage is defined as the output voltage of the battery working in the nominal zone. During the actual implementation of fast synchronization machine, the required nominal voltage of the system can be satisfied through series and parallel connection of battery units.

Battery response time represents the voltage dynamics and can be observed when a step current is applied. It is defined as the duration from the time that current applied to reach 95% of the final value. For the battery used in the fast synchronization machine, the response time should be able to facilitate the synchronization process, typically should not exceed ¼ of the total synchronization time.

According to the present disclosure, the fast synchronization machine is recommended using a high power rating synchronous machine. Therefore, the battery is configured with high nominal voltage, small response time and medium capacity. The SOC is set at 80% to allow enough region of absorbing or extracting power. For the general distributed grid with low power ratings, the battery is correspondingly configured with medium nominal voltage, small response time and medium capacity. In conclusion, the synchronization machine only works in a short duration, the battery can be implemented with low capacity. However, a short response time of the battery should be chosen to facilitate the synchronization process. The requirement of nominal voltage can be satisfied through series and parallel connection of battery units.

Design of Two-level Grid-imposed Voltage Source Power Converter

As displayed in FIG. 5B, BESS 560 is connected to the 3-φ two-level voltage source converter 565, which is modulated to realize active and reactive power generation. The converter 565 is composed of three identical half-bridge converters, and it can provide bidirectional power-flow path between the battery and 3-φ grid system. Assuming there is no ohmic voltage drop, the terminal voltage of power converter, $V_{t\{a,b,c\}}$ is expressed as:

$$V_{t\{a,b,c\}} = m_{a,b,c}(t)V_{dc}/2 \qquad (6)$$

where $m_{a,b,c}$ are the modulation signals in abc-frame, $V_{dc}$ is the voltage level of battery.

In order to obtain 3-φ AC-side voltage and a balanced 3-φ line current, the modulation signal must constitute a balanced 3-φ through closed loop control strategy. The modulation signal can be described as:

$$m_a(t) = \hat{m}(t)\cos[\varepsilon(t)] \qquad (7)$$

$$m_b(t) = \hat{m}(t)\cos[\varepsilon(t) - 2/3\pi] \qquad (8)$$

$$m_c(t) = \hat{m}(t)\cos[\varepsilon(t) - 4/3\pi] \qquad (9)$$

where ε(t) contains the information of modulation frequency and phase angle.

Because of the ideal switching of power converters, the power balance should be satisfied between the battery side and AC terminal, which can be expressed as:

$$V_{batt} \cdot I_{batt} = V_{tc} \cdot I_{tc} + V_{tc} \cdot I_{tc} + V_{tc} \cdot I_{tc} \qquad (10)$$

where $I_{t\{a,b,c\}}$ are the AC side line currents in abc-frame. $I_{batt}$ is the battery current.

For the control purpose of zero steady-state error, dq-frame strategy is applied to achieve DC quantities of control variables. A phase-locked loop (PLL) 580 as shown in FIG. 5D is utilized to extract the frequency and phase information of the controller. Each phase of the voltage source converter is interfaced with the grid via a series RL branch 570. The real and reactive power exchanged between voltage source converter and AC grid are $P_s$ and $Q_s$, respectively. Voltage and current control modes are available for the instantaneous real and reactive power control between BESS and AC grid. However, due to the shortcoming of no closed lope on the line current of voltage source converter, the voltage-mode control is not applicable in the AC grid with frequent power command changes which may experience large line current excursions. Therefore, the current-mode pattern is adopted in the present disclosure through controlling phase angle and amplitude of the converter line current with respect to the voltage at point of common coupling (PCC).

The active power $P_s$ and reactive power $Q_s$ at the PCC can be described by dq-frame according to:

$$P_s = 3/2[V_{sd}i_d + V_{sq}i_q] \qquad (11)$$

$$Q_s = 3/2[-V_{sd}i_q + V_{sq}i_d] \qquad (12)$$

In steady-state, PLL guarantees that $V_{sq}=0$. Then, the d–q axis reference currents can be denoted as:

$$i_{dref} = \frac{2}{3V_{sd}}P_{sref} \qquad (13)$$

$$i_{qref} = -\frac{2}{3V_{sd}}Q_{sref} \qquad (14)$$

The space form of the converter model can be represented by dq-frame under the condition that PLL contributes the same frequency and phase as $V_{s\{a,b,c\}}$, according to:

$$L\frac{di_d}{dt} = L\omega_0 i_q - Ri_d + V_{td} - V_{sd} \qquad (15)$$

$$L\frac{di_q}{dt} = -L\omega_0 i_d - Ri_q + V_{tq} \qquad (16)$$

Based on the dq-frame modeling of power converters, explicit control schematics is shown in FIG. 5E. The control scheme generates the modulating signals in dq-frame, which can transform to the modulating signals in abc-frame. With the current-mode control of the voltage source power converter, the power exchanged at PCC is equivalent to the reference power.

Operating Mechanisms and Simulation Results

The operating mechanisms of the BESS and converter based synchronization machine are embedded with the detection and control block in FIG. 5C. Using the proposed method, the entire synchronization process can be classified into three stages, including fast frequency compensation stage, phase matching stage, and post switch-closing stage.

During the fast frequency compensation stage, the synchronization machine delivers or absorbs large amount of power to or from the grid to gain a quick change on system frequency. Then, the machine working status shifts to the phase matching stage. During this stage, the frequency of the compensated grid, i.e. the connected grid is regulated, which slightly deviates from the nominal frequency. When the automatic power compensation controller of the detection and control block makes phase matching at the end of this stage, then the switch is closed. After closing the switch, the fast synchronization machine provides auto-controlled power to the two connected grid, which helps to damp the frequency oscillations and stabilize the system frequency.

Figure 7:
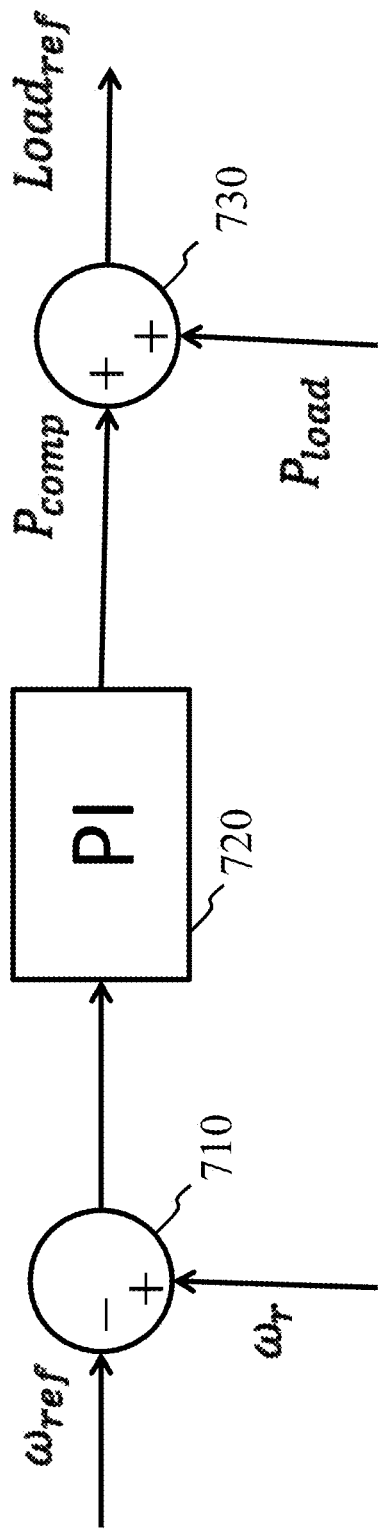
FIG. 7 is a is a schematic of an automatic power compensation controller, according to some embodiments of the present disclosure.

The schematic of automatic power compensation controller is displayed in FIG. 7. The frequency difference is computed 710 and passing through a PI block 720 to generate the amount of compensation power for the BESS. The compensation power combing with the load demand is used to set a new load reference for the automatic generation control of the generator.

These three regions are described in details below, and simulation results of the example system as shown in FIG. 5A are given to illustrate the effectiveness of fast synchronization machine. The fast synchronization machine is implemented and tested on two synchronous machine based AC grids, which are parameterized as Table. I. The initial condition of BESS is configured as Table. II.

TABLE I

Parameters of two unsynchronized AC grids

|  | Active Power | Reactive Power | Frequency | Line-to-line voltage |
|---|---|---|---|---|
| Grid 1 | 150 MW | 20 MVar | 60 Hz | 13.8 kV |
| Grid 2 | 150 MW | 10 MVar | 59.5 Hz | 13.8 kV |

TABLE II

Initial condition of BESS

| Nominal voltage | 30.36 kV |
|---|---|
| SOC | 80% |
| Rated capacity | 10 Ah |
| Battery response time | 1 seconds |
| Nominal discharge current | 200 A |

Fast Frequency Compensation Stage

Figure 8:
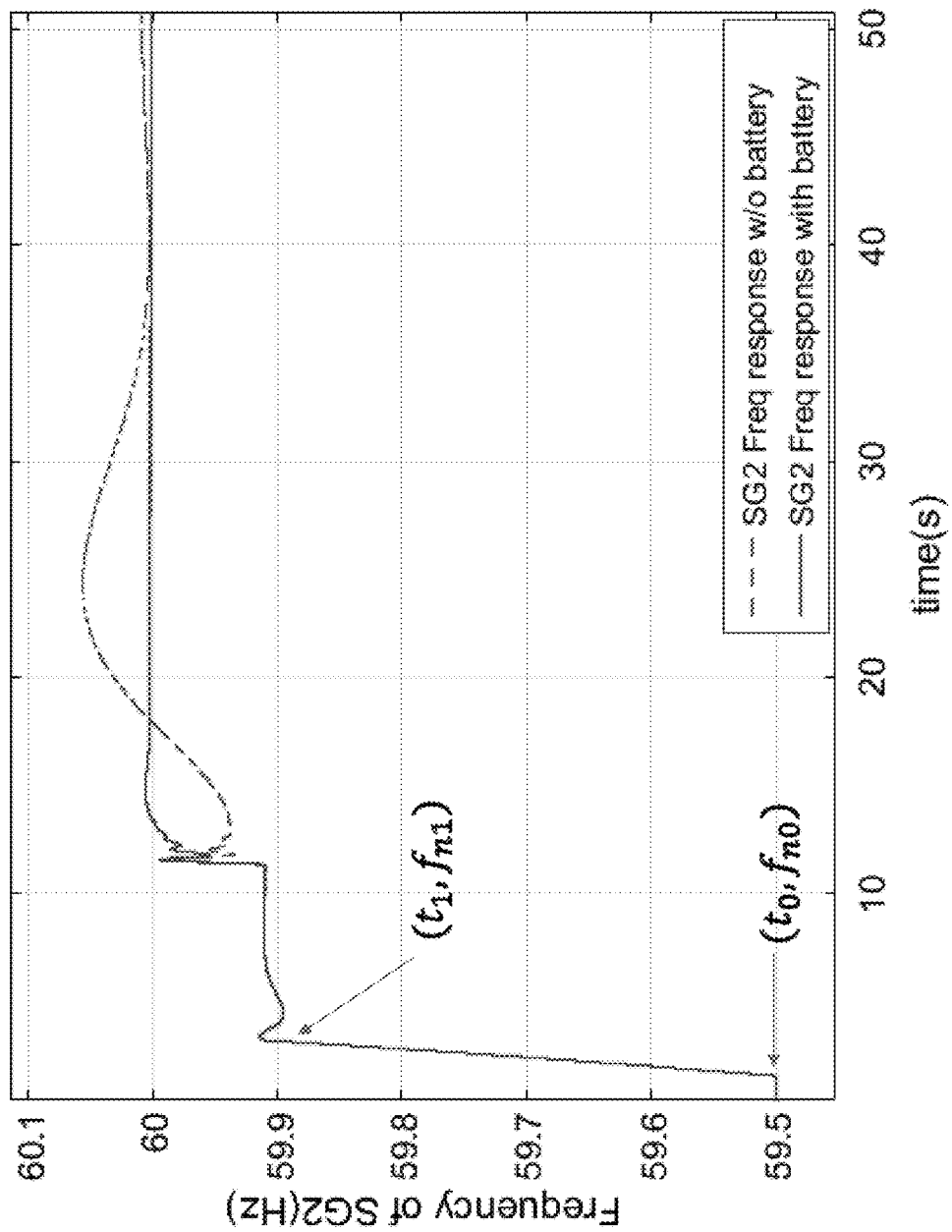
FIG. 8 is a graph illustrating the frequency response of synchronous generator 2, according to some embodiments of the present disclosure.

The fast synchronization machine is attached to the second grid. In this stage, it delivers a large amount of electric power to the second grid at the PCC, and then causes a quick frequency increase at the second grid as shown in FIG. 8. Such power compensation is equivalently to reduce the load of the second grid.

FIG. 8 is a graph illustrating the frequency response of the second grid 2 of table I, according to some embodiments of the present disclosure. As shown in FIG. 8, the frequency increase is occurring at time $t_0$=1.5 s.

As we can refer from Eq. 3, the mechanical power cannot change significantly in a short time because of the slower dynamics of the primary controller. Therefore, the frequency of the second grid will change approximately linearly during the fast power compensation stage. Then, Eq. 3 can be rewritten as $$\Delta\omega = \frac{P_m - P_e + P_{comp}}{J\omega_0} \Delta t \quad (17)$$

where $\Delta\omega$ is the frequency deviation in a period of time $\Delta t$, and $P_{comp}$ is the compensated power supplied by the fast synchronization machine. Before connecting the synchronization machine to the second grid, the AC grid works in a steady state, which means $P_m=P_e$. Then, the system can reach the desired frequency, $f_{n1}$, after a period of time, $\Delta t$:

$$f_{n1} = f_{n0} + \frac{P_{comp}}{J\omega_0} \Delta t \quad (18)$$

In this testing case, $f_{n0}$=59.5 Hz, $f_{n1}$=59.91 Hz, $P_{comp}$=5 MW and $\Delta t$=1.65 s. At time $t_1$=3.15 s, the frequency of the second grid arrives at the phase matching point, which is denoted as $f_{n1}$, in (18). During the fast frequency compensation stage, the BESS is continuously supplying power to the grid until the phase matching point is reached.

In this stage, the first amount of power, $P_{comp1}$ is determining for fast frequency compensation based on a difference between a first predetermined frequency $f_{n1}$, and a second predetermined frequency, $f_{n0}$ of either the first grid or the second grid:

$$P_{comp1} = J\omega_0 \frac{(f_{n1} - f_{n0})}{\Delta t} \quad (19)$$

where $\Delta t$ is the fast compensation time, and $\Delta t$ can be determined based on the battery discharging/charging rate and the allowed frequency variation speed for equipment.

Phase Matching Stage

In this stage, the frequency reference of the second grid is adjusted, and the automatic power compensation controller is applied to match the phase. After time $t_1$, the system needs to maintain the frequency at $f_{n1}$. However, $f_{n1}$ starts to drop because of the dynamics of the governor. In order to keep the phase matching frequency, the frequency reference should be changed and the automatic power compensation controller should be utilized.

Due to the fact that $P_m \neq P_e$ if battery is removed after timer $t_1$, the automatic power compensation controller is activated at this time to provide the desired power to the grid, which guarantees that $P_m - P_e + P_{comp} = 0$ in Eq. 20:

$$J\frac{d\omega}{dt} = \frac{P_m - P_e + P_{comp}}{\omega_0} \quad (20)$$

The output of automatic power compensation controller supplies dynamic electrical power, which counteracts the dynamics of mechanical power. Through the compensated power of BESS, frequency requirements of $d\omega/dt=0$ and $\omega_r=\omega_{ref}=f_{n1}$ are satisfied. In order to close the switch, the frequency deviation between two AC grids systems should be satisfied with predetermined thresholds. The frequency of the second grid holds at $f_{n1}$ to wait for the phase matching with the first grid.

In this stage, the second amount of power, $P_{comp2}$ is determined for matching a difference between a mechanical output power, $P_m$ and a output electrical power, $P_e$ to maintain the first or the second grid frequency constant as the first predetermined frequency, $f_{n1}$:

$$P_{comp2} = P_m - P_e \quad (21)$$

Figure 4:
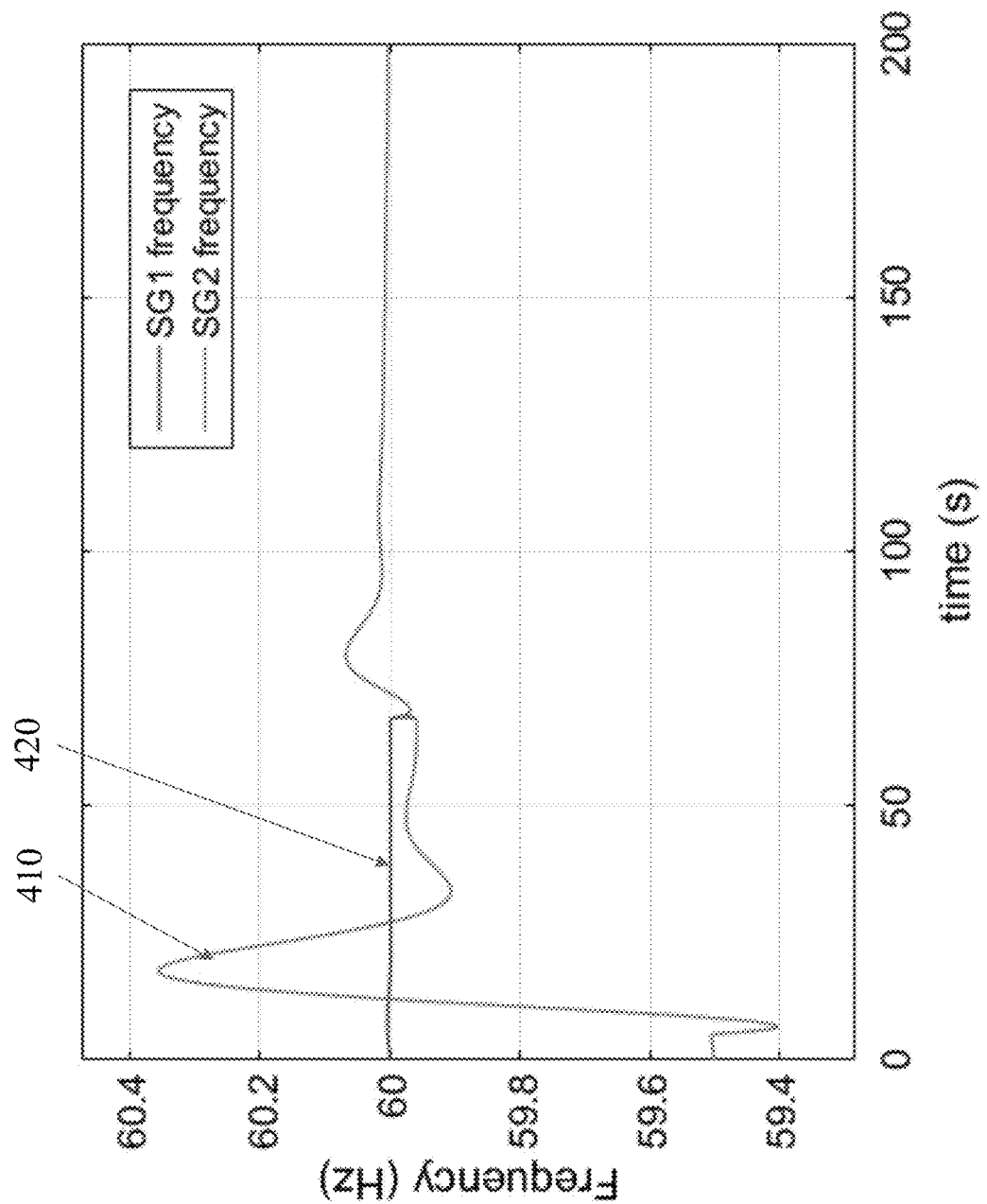
FIG. 4 is a graph illustrating the frequency responses of generators in FIG. 2 during a traditional synchronization process.
Figure 9:
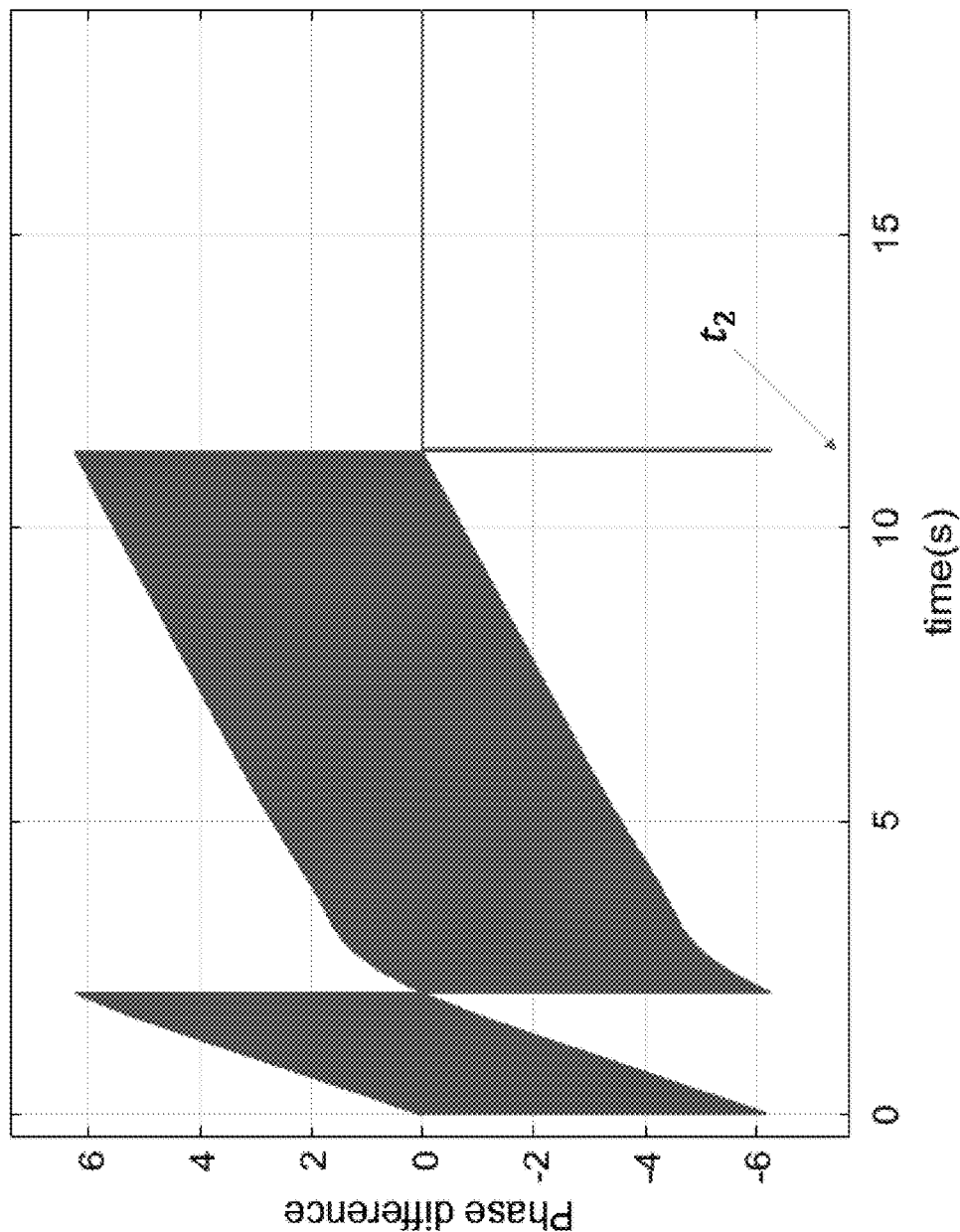
FIG. 9 is a graph illustrating the phase difference between two systems during the synchronization process, according to some embodiments of the present disclosure.

FIG. 9 is a graph illustrating the phase difference between two grids, according to some embodiments of the present disclosure. As shown in FIG. 9, the phase matches at time $t_2$=11.3 seconds. Then, the switch closes after time $t_2$. The entire process takes less than 10 seconds ($t_2-t_0$=9.8 seconds), which is significantly less than the traditional synchronization method as shown in FIG. 4.

Post Switch-closing Stage

In this stage, the in-rush current on the tie line between systems is monitored, and the automatic power compensation controller is also utilized to damp frequency oscillations caused by phase and frequency difference before the closing. During phase matching stage, the frequency $f_{n1}$ is kept at a fixed magnitude, which allows the phase difference between two systems can be reduced and reach a tolerable smaller value at the end of the stage. After closing the switch between two systems, the in-rush current flows on the tie line and frequency oscillations will be monitored, and the corresponding results for the testing case are given in FIGS. 10A, 10B, 11A and 11B, respectively.

Figure 10A:
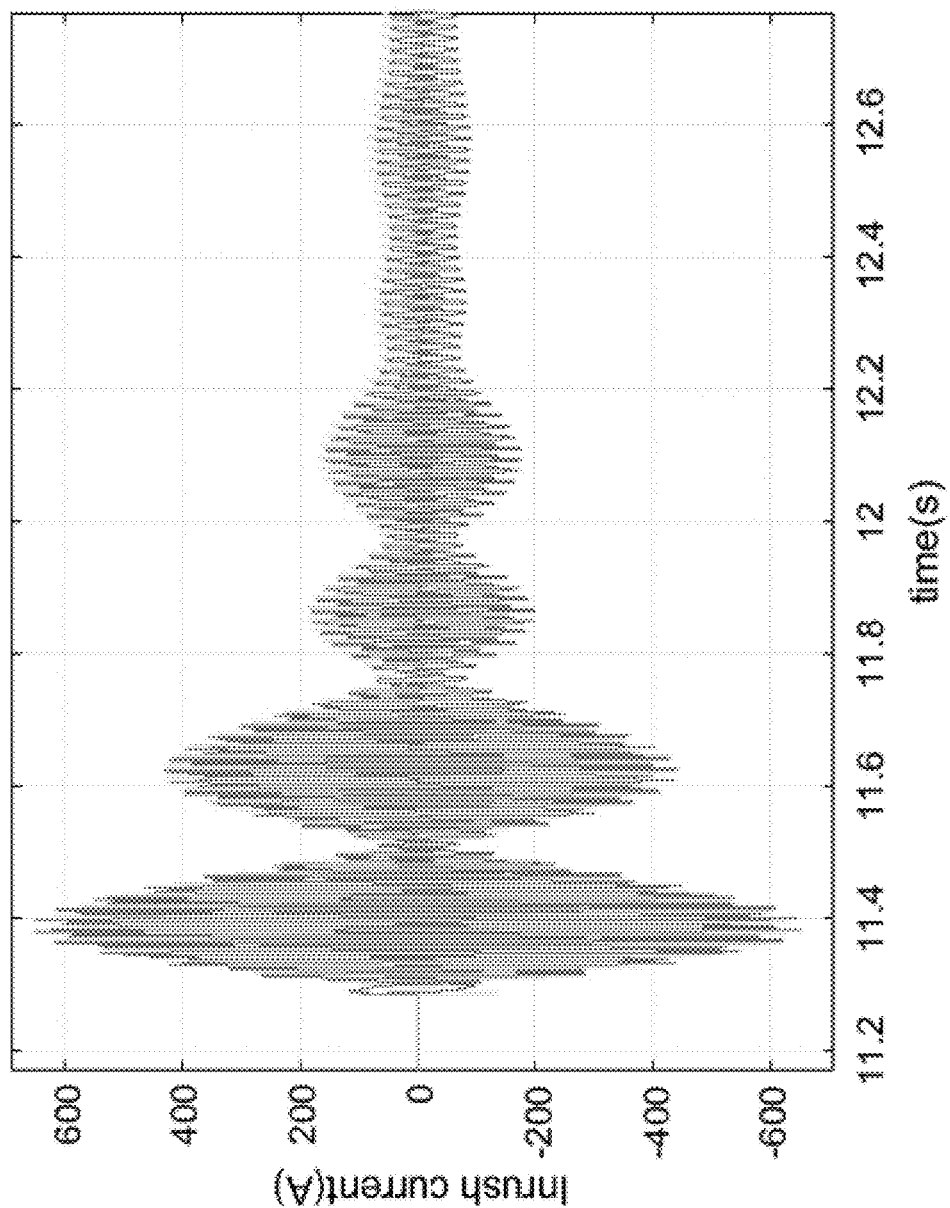
FIG. 10A is a graph illustrating an example of in-rush current on the transmission line when the angle difference is small (such as $\Delta\phi=0.01°$), according to some embodiments of the present disclosure.
Figure 10B:
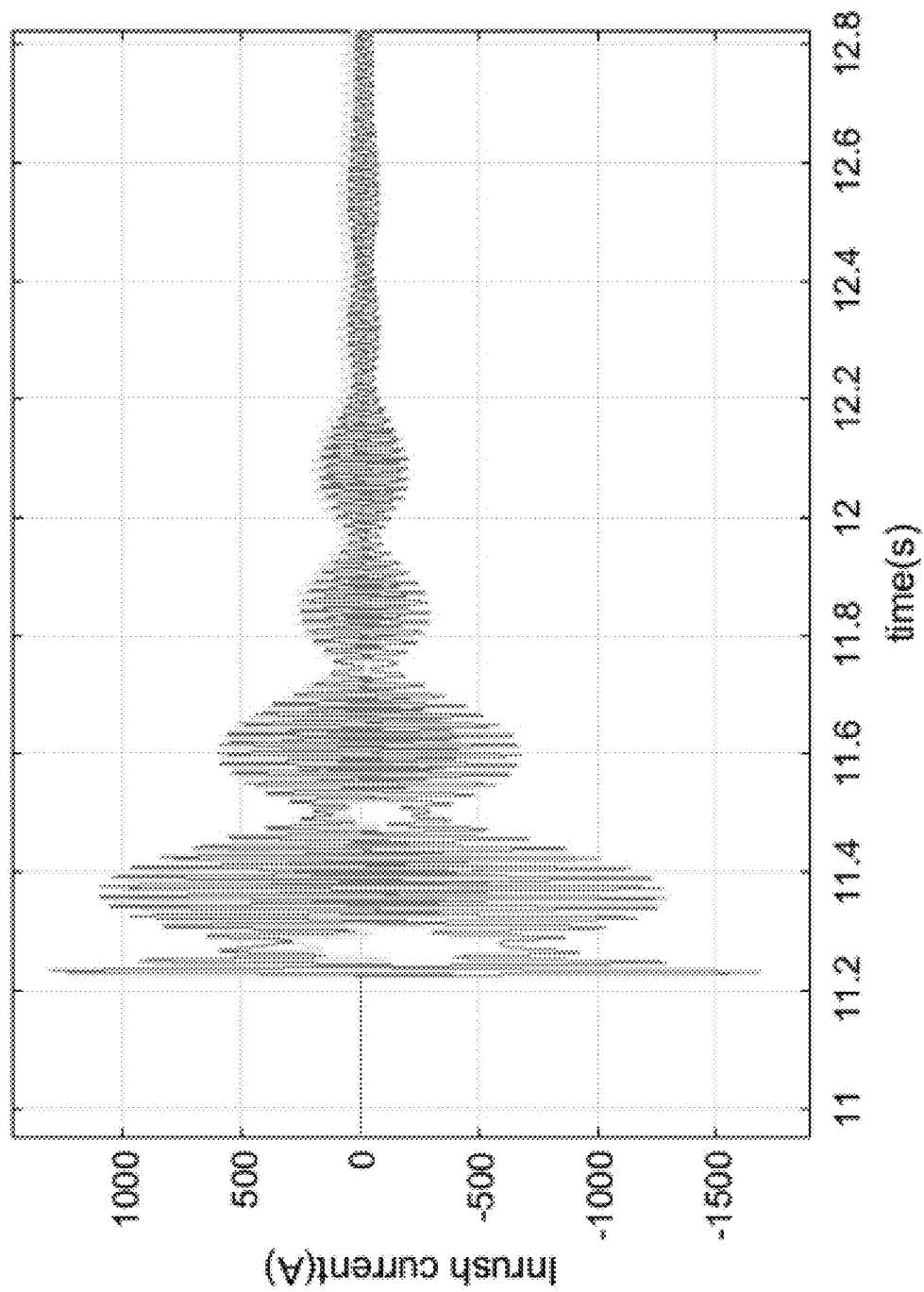
FIG. 10B is a graph illustrating an example of in-rush current on the transmission line when the angle difference is big (such as $\Delta\phi=2°$), according to some embodiments of the present disclosure.

FIGS. 10A, and 10B give the in-rush current results obtained by two scenarios that have different phase differences, but same frequency difference between two grids at the moment of switch closing. FIG. 10A is a graph illustrating an example of in-rush current on the transmission line ($\Delta\phi=0.01°$), according to some embodiments of the present disclosure. FIG. 9B is a graph illustrating an example of in-rush current on the transmission line ($\Delta\phi=2°$), according to some embodiments of the present disclosure.

As shown in FIGS. 10A, and 10B, the after-closing inrush currents are depending on the before-closing phase difference. The in-rush current can be minimized if the phases between the systems are exactly matched before closing. In addition, during the simulation we also found that the phase difference has a superior impact on the magnitude of in-rush current than the frequency difference. After closing the switch, the automatic power compensation controller is continuing to be used to generate the electrical power to stabilize the system frequency at $f_{n2}=60$ Hz. The only difference for the usage of automatic power compensation controllers between phase matching stage and post switch closing stage is that the referenced frequency is set as $\omega_{ref}=60$ Hz in the post switch closing stage, but $\omega_{ref}=59.91$ Hz in the phase matching stage.

Figure 11A:
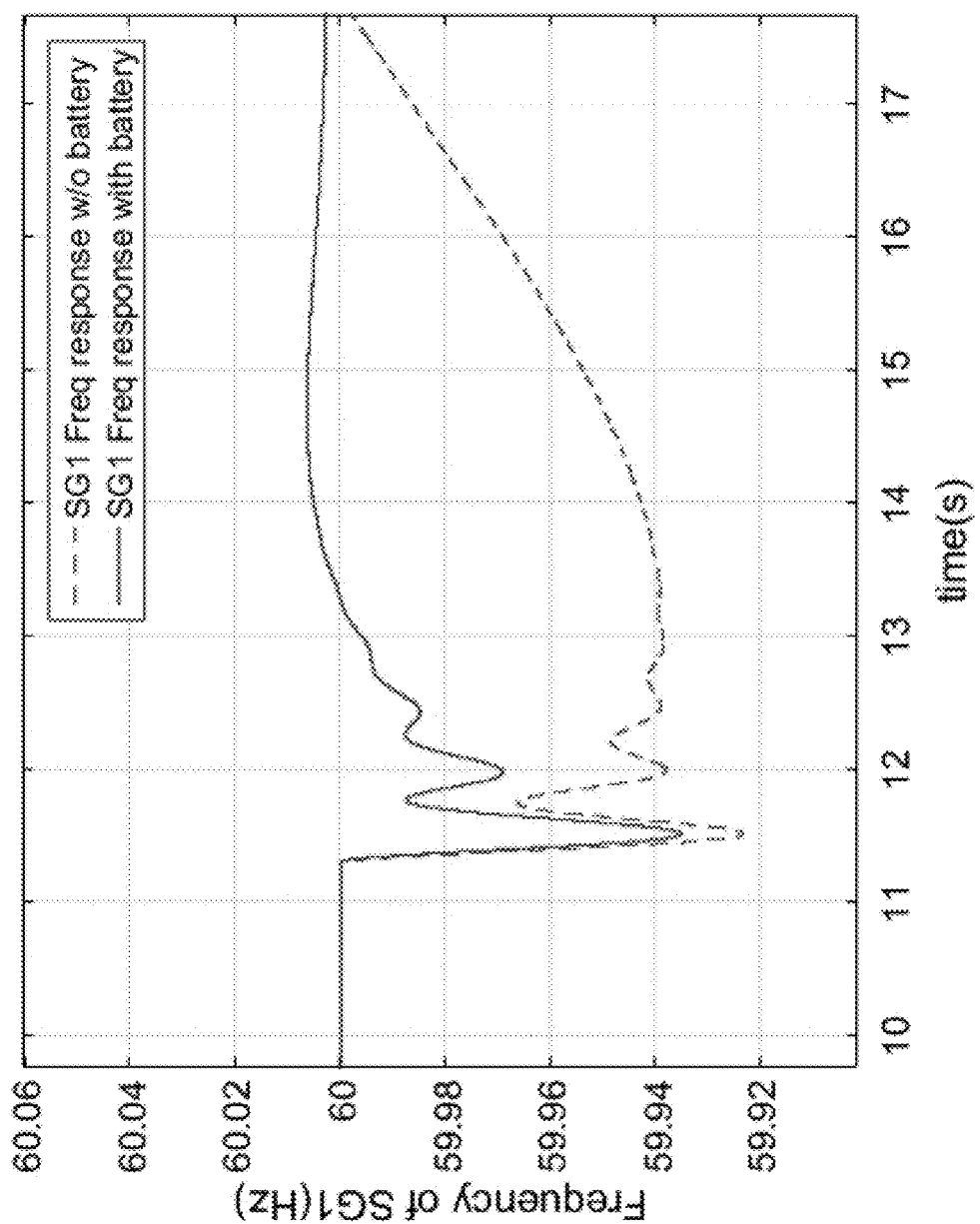
FIG. 11A is a graph illustrating the frequency response of synchronous generator 1 after closing the switch, according to some embodiments of the present disclosure.
Figure 11B:
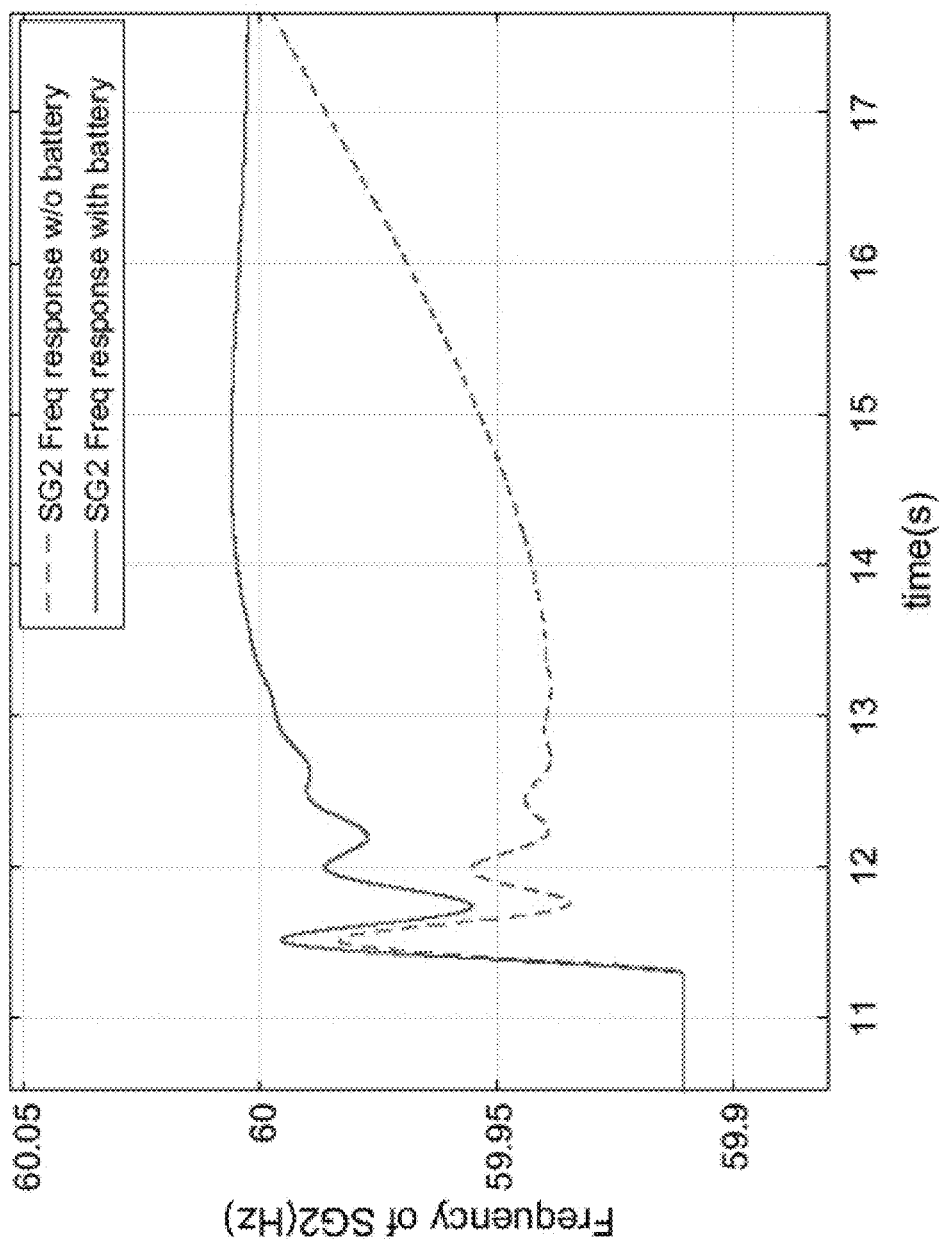
FIG. 11B is a graph illustrating the frequency response of synchronous generator 2 after closing the switch, according to some embodiments of the present disclosure.

FIGS. 11A, and 11B demonstrates the frequency oscillation damping effect provided by the BESS. FIG. 11A is a graph illustrating the frequency response of the first grid after closing the switch, according to some embodiments of the present disclosure. FIG. 11B is a graph illustrating the frequency response of the second grid after closing the switch, according to some embodiments of the present disclosure.

In FIGS. 11A, and 11B, the dashed line represents the frequency behavior without the support of BESS in the post switch closing stage, while the solid line stands for the frequency response with BESS participation. It is obvious that the BESS-based fast synchronization has the capability to damp the oscillations and improve the stability of systems.

Dynamic Response of the Battery

Figure 12A:
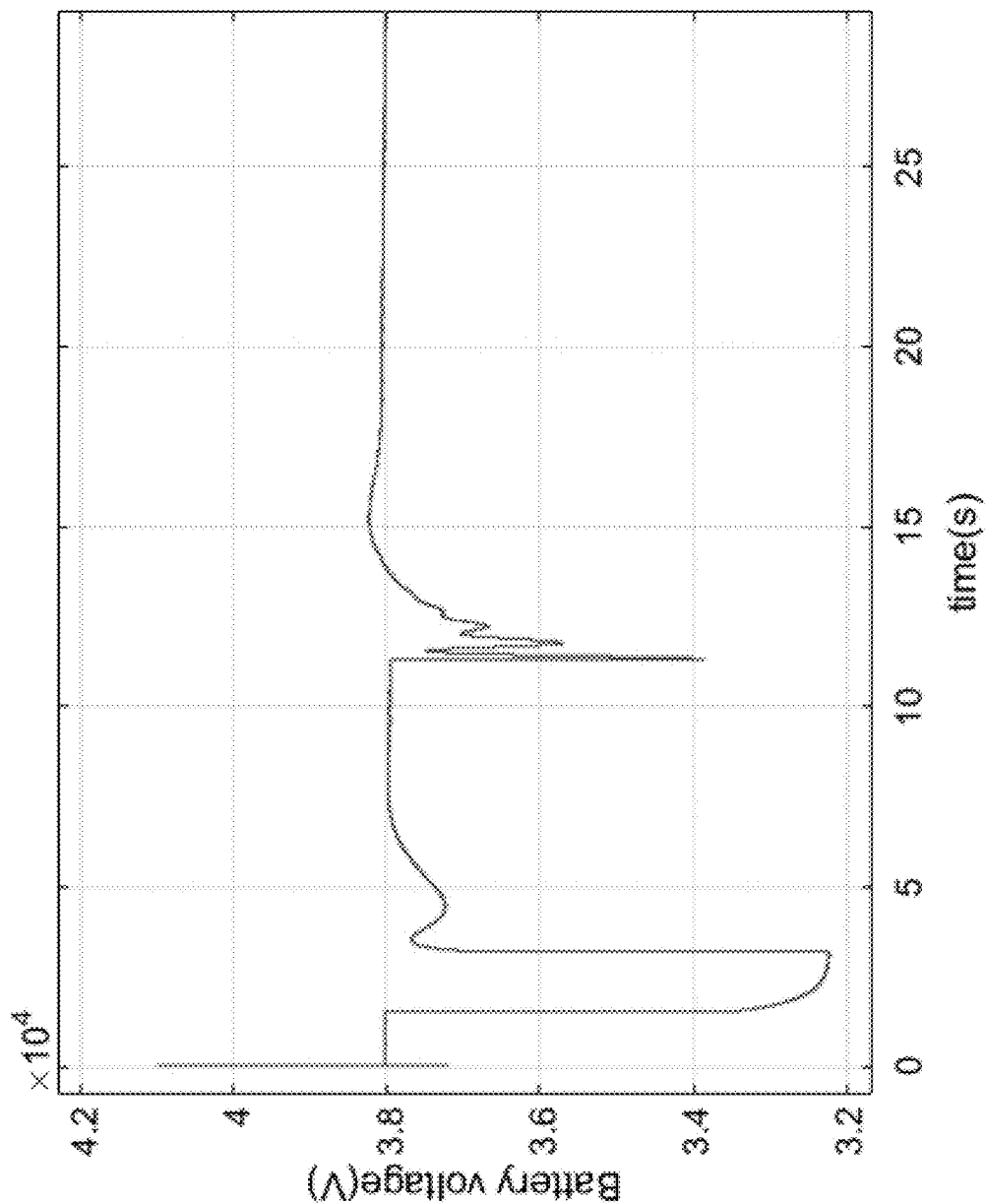
FIG. 12A is a graph illustrating the voltage dynamics of the battery, according to some embodiments of the present disclosure.
Figure 12B:
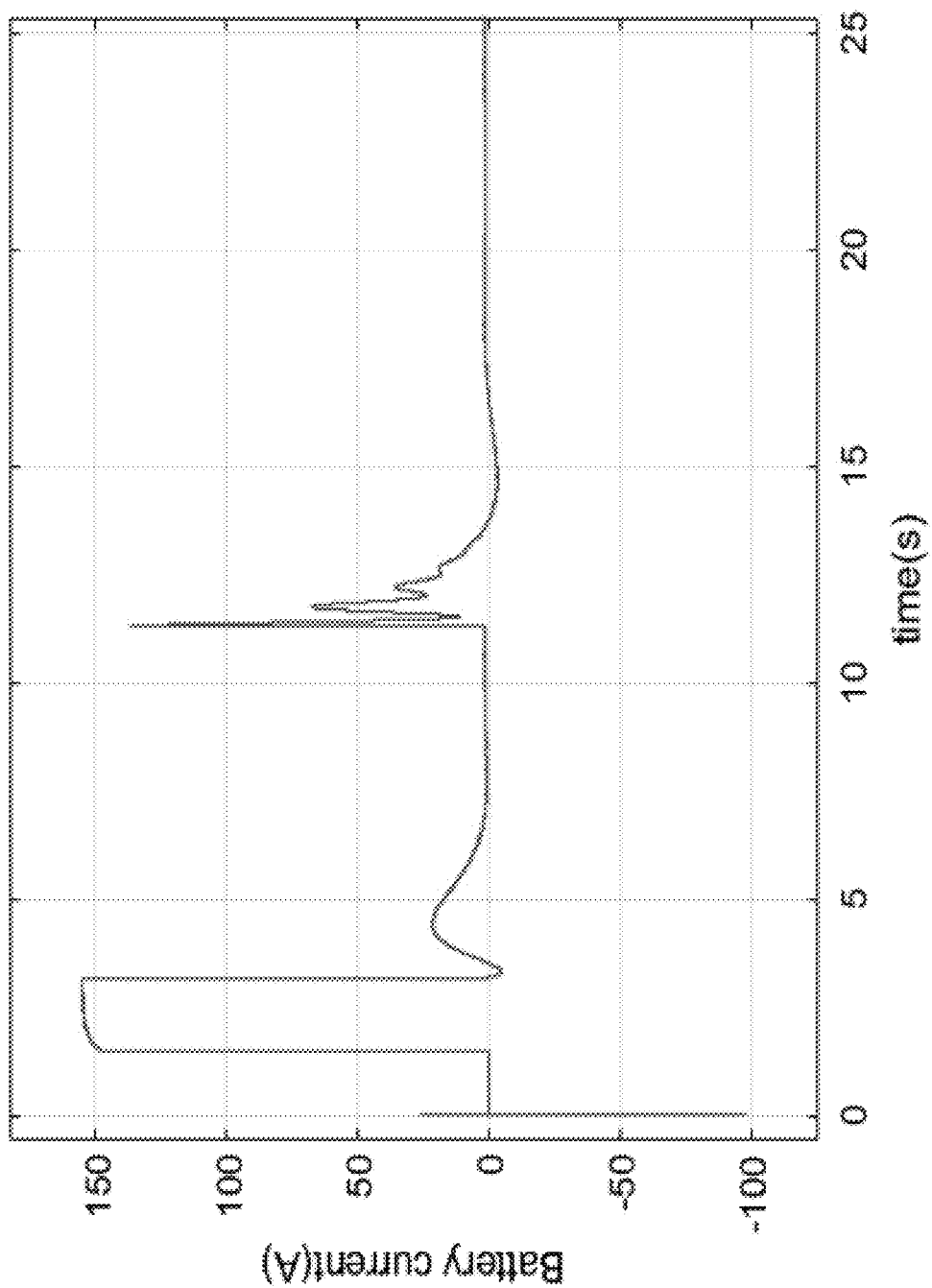
FIG. 12B is a graph illustrating the current dynamics of the battery, according to some embodiments of the present disclosure.
Figure 12C:
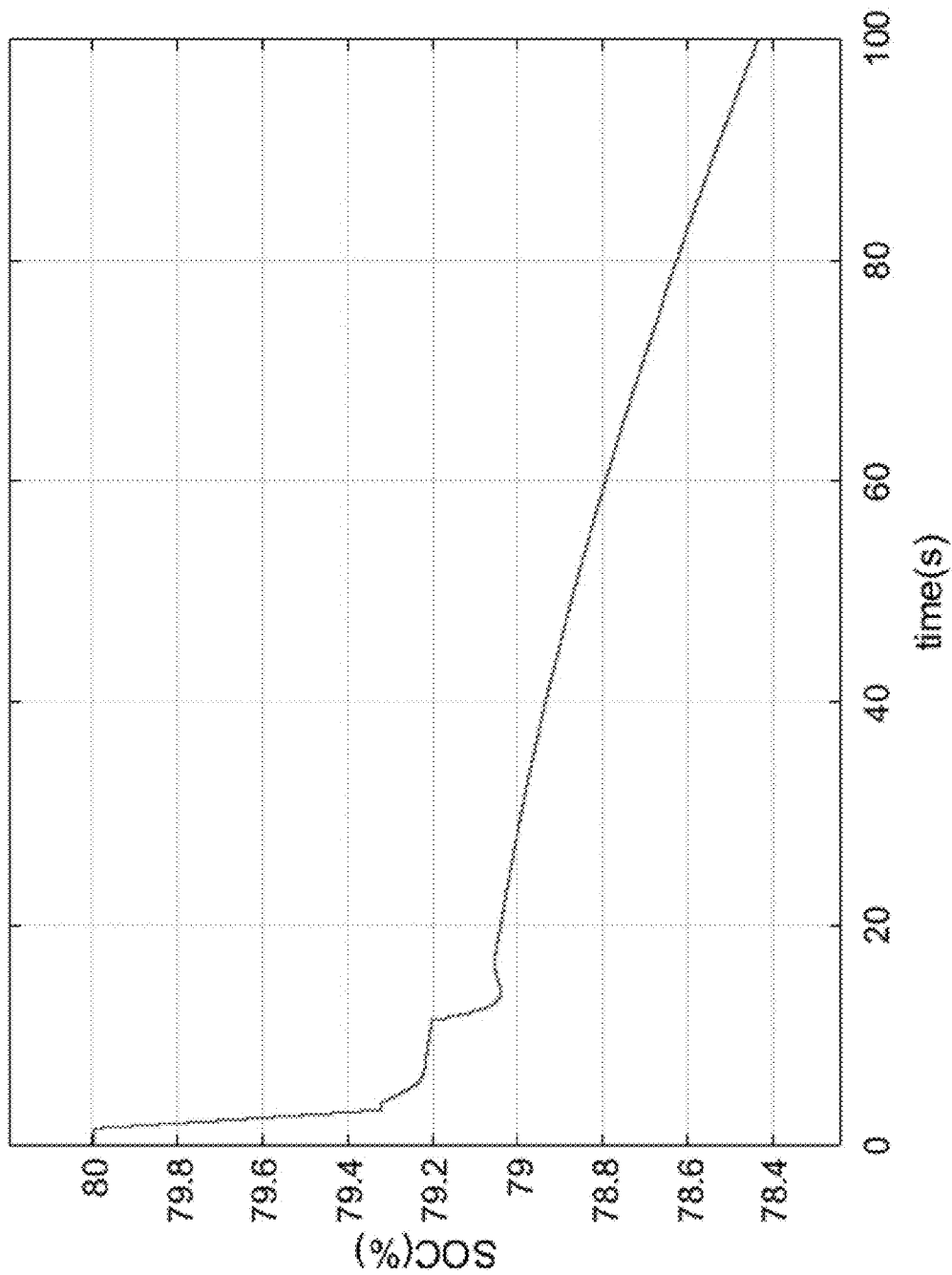
FIG. 12C is a graph illustrating the SOC of the battery, according to some embodiments of the present disclosure.

FIGS. 12A, 12B and 12C show the dynamics of battery voltage, current and SOC during the synchronization process. FIG. 12A is a graph illustrating the voltage dynamics of the battery, according to some embodiments of the present disclosure. FIG. 12B is a graph illustrating the current dynamics of the battery, according to some embodiments of the present disclosure. FIG. 12C is a graph illustrating the SOC of the battery, according to some embodiments of the present disclosure.

During the fast frequency compensation stage, the battery produces significant amount of current to compensate the power requirements of AC grids. While in the phase matching and post switch-closing stages, the battery continue providing the currents to meet the needs of the automatic power compensation controller.

As demonstrated by the results of voltage dynamic response, the battery used by the fast synchronization machine should have a fast enough response to the variations of output current. Selecting an appropriate battery for the fast synchronous machine is of critical importance for the proper functioning of the proposed fast synchronization mechanism.

The key factors for battery selection are the nominal current magnitude and voltage response time. In addition, maintaining a reasonable level of SOC is also important for overall performance of the synchronization machine. In the testing case given in the present disclosure, the frequency of the regulated synchronous machine is lower than the nominal frequency, so the AC system always extracts power from the battery. However, if the regulated machine works with a frequency higher than the nominal value, the battery needs to absorb power from the AC system. Based on the bidirectional power transfer characteristic of the battery, we suggest the SOC should maintain a level between 30% and 80% before starting the synchronization process.

Figure 13:
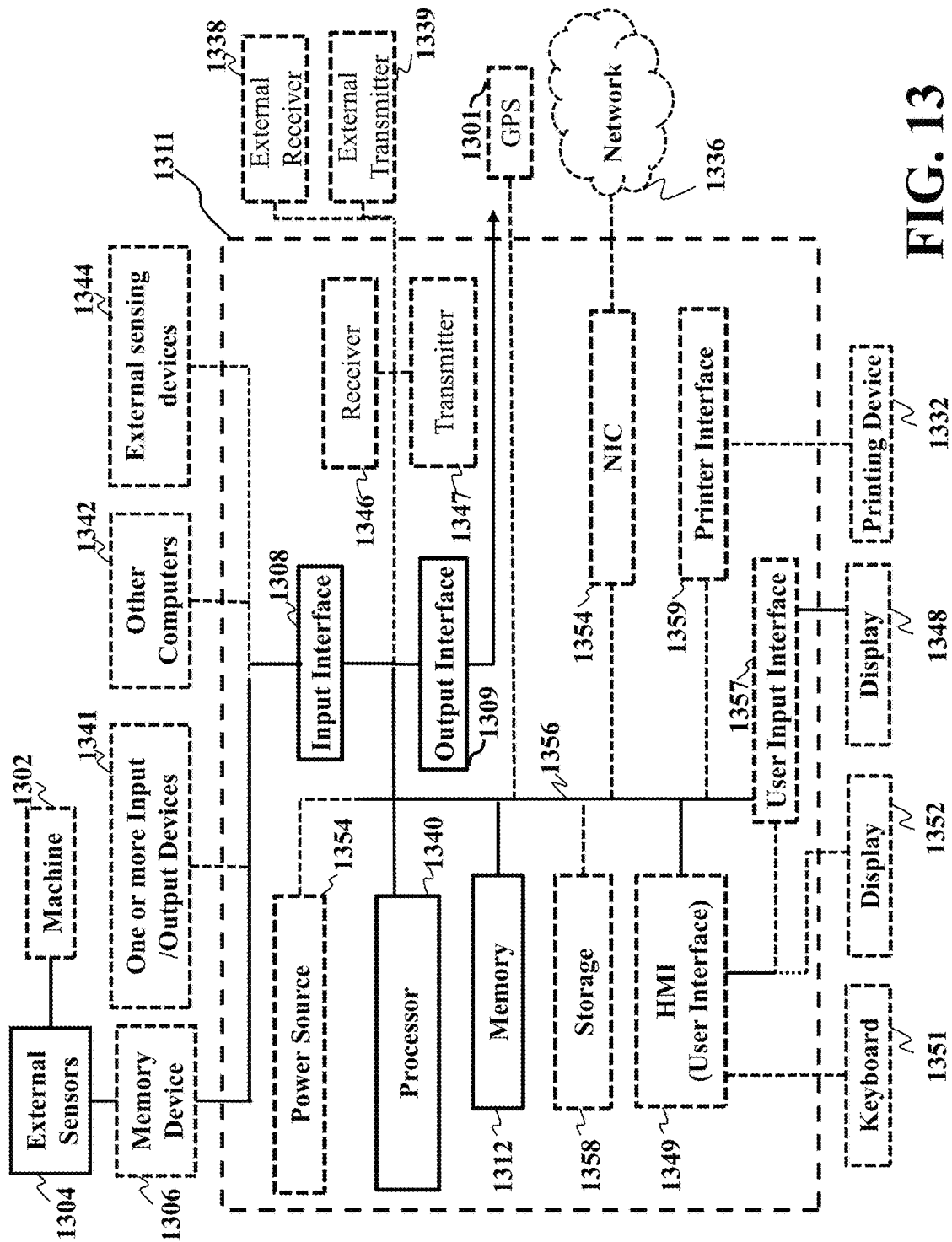
FIG. 13 is a block diagram of illustrating the method of FIG. 1A, that can be implemented using an alternate computer or processor, according to embodiments of the present disclosure.

FIG. 13 is a block diagram of illustrating the method of FIG. 1A, that can be implemented using an alternate controller, according to embodiments of the present disclosure. The controller 1311 includes a processor 1340, computer readable memory 1312, storage 1358 and user interface 1349 with display 1352 and keyboard 1351, which are connected through bus 1356. For example, the user interface 1349 in communication with the processor 1340 and the computer readable memory 1312, acquires and stores the data in the computer readable memory 1312 upon receiving an input from a surface, keyboard surface, of the user interface 1357 by a user.

Contemplated is that the memory 1312 can store instructions that are executable by the processor, historical data, and any data to that can be utilized by the methods and systems of the present disclosure. The processor 1340 can be a single core processor, a multi-core processor, a computing cluster, or any number of other configurations. The processor 1340 can be connected through a bus 1356 to one or more input and output devices. The memory 1312 can include random access memory (RAM), read only memory (ROM), flash memory, or any other suitable memory systems.

Still referring to FIG. 13, a storage device 1358 can be adapted to store supplementary data and/or software modules used by the processor. For example, the storage device 1358 can store historical data and other related data as mentioned above regarding the present disclosure. Additionally, or alternatively, the storage device 1358 can store historical data similar to data as mentioned above regarding the present disclosure. The storage device 1358 can include a hard drive, an optical drive, a thumb-drive, an array of drives, or any combinations thereof.

The system can be linked through the bus 1356 optionally to a display interface (not shown) adapted to connect the system to a display device (not shown), wherein the display device can include a computer monitor, camera, television, projector, or mobile device, among others.

The controller 1311 can include a power source 1354, depending upon the application the power source 1354 may be optionally located outside of the controller 1311. Linked through bus 1356 can be a user input interface 1357 adapted to connect to a display device 1348, wherein the display device 1348 can include a computer monitor, camera, television, projector, or mobile device, among others. A printer interface 1359 can also be connected through bus 1356 and adapted to connect to a printing device 1332, wherein the printing device 1332 can include a liquid inkjet printer, solid ink printer, large-scale commercial printer, thermal printer, UV printer, or dye-sublimation printer, among others. A network interface controller (NIC) 1334 is adapted to connect through the bus 1356 to a network 1336, wherein data or other data, among other things, can be rendered on a third party display device, third party imaging device, and/or third party printing device outside of the controller 1311.

Still referring to FIG. 13, the data or other data, among other things, can be transmitted over a communication channel of the network 1336, and/or stored within the storage system 1358 for storage and/or further processing. Further, the data or other data may be received wirelessly or hard wired from a receiver 1346 (or external receiver 1338) or transmitted via a transmitter 1347 (or external transmitter 1339) wirelessly or hard wired, the receiver 1346 and transmitter 1347 are both connected through the bus 1356. The controller 1311 may be connected via an input interface 1308 to external sensing devices 1344 and external input/output devices 1341. The controller 1311 may be connected to other external computers 1342. An output interface 1309 may be used to output the processed data from the processor 1340.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A power system, comprising:
a first grid including a first generator having first power flow parameters, and a second grid including a second generator having second power flow parameters;
a breaker installed at a point of common coupling between the first grid and the second grid, the breaker in an open position separates the first grid from the second grid, and in a close position connects the first grid with the second grid;
a first sensor located on a side of the point of the common coupling for continually determining power flow parameters of the first grid, and a second sensor located on an other side of the point of the common coupling for continually determining power flow parameters of the second grid, the power flow parameters are indicative of at least a frequency and a phase;
an additional power source for supplying dynamic power compensation for automatic generation control of the generator to either the first grid or the second grid, the compensated power provided by the additional source are varied among a pluralities of stages, wherein the pluralities of stages includes a fast frequency compensation stage to determine a difference between a first predetermined frequency, and the frequency, of either the first grid or the second grid, a phase matching stage is determined for matching a difference between a mechanical output power, and a output electrical power, and a post-switch closing stage determines a third amount of power after the switch is closed to regulate the frequency of the connected grid; and
a controller in communication with the sensors and the additional power source, is configure to:
iteratively control the additional power source to supply a first amount of power based on continually determining a frequency mismatch between the first grid and the second grid, until a first predetermined condition is met;
determine if the first grid and the second grid have reached a second predetermined condition of at least phase mismatches and the frequencies mismatches of the first and the second grid, if not, iteratively control the additional power source to supply a second amount of power until the second predetermined condition is met, wherein the breaker changes position from the open position to the close position when the second predetermined condition is met.

2. The power system of claim 1, wherein the first amount of power, $P_{comp1}$ is determining for the fast frequency compensation stage based on the difference between the first predetermined frequency $f_{n1}$, and the frequency, $f_{n0}$ of either the first grid or the second grid:

$$P_{comp1} = J\omega_0 \frac{(f_{n1} - f_{n0})}{\Delta t}$$

wherein J is the moment of inertia, $\omega_0$ is the synchronous speed, and $\Delta t$ is the predetermined fast compensation time, wherein the compensation power combing with the load demand is used to set a new load reference for the automatic generation control of the generator.

3. The power system of claim 1, wherein the phase matching stage includes the second amount of power, $P_{comp2}$ that is determined for matching the difference between the mechanical output power, $P_m$ and the output electrical power, $P_e$ to maintain the first or the second grid frequency constant as the first predetermined frequency, $f_{n1}$:

$$P_{comp2} = P_m - P_e$$

wherein the compensation power combining with the load demand is used to set a new load reference for the automatic generation control of the generator.

4. The power system of claim 1, wherein the power flow parameters are from the group consisting of a frequency, a phase angle, a voltage magnitude or a phase sequence.

5. The power system of claim 1, wherein the first and the second sensors are a phase-locked loop type sensor that receives three phase voltage when connected to the first grid or the second grid, to at least determine a phase angle and a frequency.

6. The power system of claim 1, wherein the additional power source includes a converter, that is a three-phase two-level voltage source converter connected to a DC voltage source, such that the converter injects or extracts three-phase currents to or from the connected first grid or the second grid.

7. The power system of claim 6, wherein the DC voltage source is a battery energy storage system (BESS).

8. The power system of claim 7, wherein the BESS extracts three-phase currents from the connected first grid or the second grid through battery charging, and injects three-phase currents into the connected first or the second grid through battery discharging.

9. The power system of claim 6, wherein the three-phase currents are continually adjusted by a dq-frame current control of the controller, based on the continually adjusted amount of power determined by the controller.

10. The power system of claim 8, wherein the three phase currents from the convertor is limited by a charging speed or a discharging speed, and an available state of charge of the BESS.

11. The power system of claim 1, wherein the controller determines the third amount of power after the switch is closed to damp the frequency oscillations and stabilize the frequency at the second predetermined frequency.

12. A synchronizer for a power system including a first grid having a first generator with first power flow parameters, a second grid having a second generator with second power flow parameters, and a breaker installed at a point of common coupling between the first grid and the second grid, wherein the breaker in an open position separates the first grid from the second grid, and in a close position connects the first grid with the second grid, the synchronizer comprising:
 a first sensor located on a side of the point of the common coupling for continually determining the power flow parameters of the first grid, and a second sensor located on an other side of the point of the common coupling for continually determining the power flow parameters of the second grid, wherein the power flow parameters of the first and the second grid are indicative of at least a frequency and a phase;
 an additional power source for supplying dynamic power compensation for automatic generation control of the generator to either the first grid or the second grid, the compensated power provided by the additional source are varied among a pluralities of stages, wherein the pluralities of stages includes a fast frequency compensation stage to determine a difference between a first predetermined frequency, and the frequency, of either the first grid or the second grid, a phase matching stage is determined for matching a difference between a mechanical output power, and a output electrical power, and a post-switch closing stage determines a third amount of power after the switch is closed to regulate the frequency of the connected grid; and
 a controller in communication with the sensors and the additional power source, is configure to:
  iteratively control the additional power source to supply a first amount of power based on continually determining a frequency mismatch between the first grid and the second grid, until a first predetermined condition is met;
  determine if the first grid and the second grid have reached a second predetermined condition of at least phase mismatches and the frequencies mismatches of the first and the second grid, if not, iteratively control the additional power source to supply a second amount of power until the second predetermined condition is met, wherein the breaker changes position from the open position to the close position when the second predetermined condition is met.

13. The synchronizer of claim 12, wherein the first amount of power, $P_{comp1}$ is determining for the fast frequency compensation stage based on the difference between the first predetermined frequency $f_{n1}$, and the frequency, $f_{n0}$ of either the first grid or the second grid:

$$P_{comp1} = J\omega_0 \frac{(f_{n1} - f_{n0})}{\Delta t}$$

wherein J is the moment of inertia, $\omega_0$ is the synchronous speed, and $\Delta t$ is the predetermined fast compensation time, wherein the compensation power combing with the load demand is used to set a new load reference for the automatic generation control of the generator.

14. The synchronizer of claim 12, wherein the phase matching stage includes the second amount of power, $P_{comp2}$ that is determined for matching the difference between the mechanical output power, $P_m$ and the output electrical power, $P_e$ to maintain the first or the second grid frequency constant as the first predetermined frequency, $f_{n1}$:

$$P_{comp2} = P_m - P_e$$

wherein the compensation power combing with the load demand is used to set a new load reference for the automatic generation control of the generator.

15. The synchronizer of claim 12, wherein the additional power source includes a converter, that is a three-phase two-level voltage source converter connected to a DC voltage source that is a battery energy storage system (BESS), such that the converter injects or extracts three-phase currents to or from the connected first grid or the second grid, the DC voltage source, wherein the BESS extracts three-phase currents from the connected first grid or the second grid through battery charging, and injects three-phase currents into the connected first or the second grid through battery discharging.

16. The synchronizer of claim 15, wherein the three-phase currents are continually adjusted by a dq-frame current control of the controller, based on the continually adjusted amount of power determined by the controller, wherein the three phase currents from the convertor is limited by a charging speed or a discharging speed, and an available state of charge of the BESS.

17. The synchronizer of claim 12, wherein the controller determines the third amount of power after the switch is closed to damp the frequency oscillations and stabilize the frequency at the second predetermined frequency.

18. A synchronizer for a power system including a generator having first power flow parameters, a grid having a grid generator having second power flow parameters, and a breaker installed at a point of common coupling between the generator and the grid, wherein the breaker in an open position separates the generator from the grid, and in a close position connects the generator with the grid, the synchronizer comprising:
 a first sensor located on a side of the point of the common coupling for continually determining power flow parameters of the generator, and a second sensor located on an other side of the point of the common coupling for continually determining power flow parameters of the grid, wherein the power flow parameters for the generator and the grid are indicative of at least a frequency and a phase angle;
 an additional power source for supplying dynamic power compensation for automatic generation control of the generator to either the first grid or the second grid, the compensated power provided by the additional source are varied among a pluralities of stages, wherein the pluralities of stages includes a fast frequency compensation stage to determine a difference between a first predetermined frequency, and the frequency, of either the first grid or the second grid, a phase matching stage is determined for matching a difference between a mechanical output power, and a output electrical power, and a post-switch closing stage determines a third amount of power after the switch is closed to regulate the frequency of the connected grid; and a controller in communication with the sensors and the additional power source, is configure to:
- iteratively control the additional power source to supply a first amount of power based on continually determining a frequency mismatch between the first grid and the second grid, until a first predetermined condition is met;
- determine if the first grid and the second grid have reached a second predetermined condition of at least phase mismatches and the frequencies mismatches of the first and the second grid, if not, iteratively control the additional power source to supply a second amount of power until the second predetermined condition is met,
- wherein the breaker changes position from the open position to the close position when the second predetermined condition is met.

19. The synchronizer of claim 18, wherein the additional power source includes a converter, that is a three-phase two-level voltage source converter connected to a DC voltage source that is a battery energy storage system (BESS), such that the converter injects or extracts three-phase currents to or from the connected first grid or the second grid, the DC voltage source, wherein the BESS extracts three-phase currents from the connected first grid or the second grid through battery charging, and injects three-phase currents into the connected first or the second grid through battery discharging.

20. The synchronizer of claim 19, wherein the three-phase currents are continually adjusted by a dq-frame current control of the controller, based on the continually adjusted amount of power determined by the controller, the three phase currents from the convertor is limited by a charging speed or a discharging speed, and an available state of charge of the BESS.

* * * * *